United States Patent
Whelan et al.

(10) Patent No.: US 10,460,463 B2
(45) Date of Patent: Oct. 29, 2019

(54) MODELLING A THREE-DIMENSIONAL SPACE

(71) Applicant: IMPERIAL COLLEGE OF SCIENCE, TECHNOLOGY AND MEDICINE, London (GB)

(72) Inventors: Thomas Whelan, London (GB); Renato Fernando Salas Moreno, London (GB); Stefan Leutenegger, London (GB); Andrew Davison, London (GB); Ben Glocker, Cambridge (GB)

(73) Assignee: Imperial College of Science, Technology and Medicine, London (GB)

( * ) Notice: Subject to any disclaimer, the term of this patent is extended or adjusted under 35 U.S.C. 154(b) by 79 days.

(21) Appl. No.: 15/822,637

(22) Filed: Nov. 27, 2017

(65) Prior Publication Data

US 2018/0082435 A1    Mar. 22, 2018

Related U.S. Application Data

(63) Continuation of application No. PCT/GB2016/051423, filed on May 17, 2016.

(30) Foreign Application Priority Data

May 27, 2015    (GB) .................................. 1509068.1

(51) Int. Cl.
  *G06T 17/00*    (2006.01)
  *G06T 7/579*    (2017.01)
(52) U.S. Cl.
  CPC .......... *G06T 7/579* (2017.01); *G06T 2200/04* (2013.01); *G06T 2200/08* (2013.01);
  (Continued)

(58) Field of Classification Search
  CPC ....... G06T 7/50–7/596; G06T 2200/04; G06T 2200/08; G06T 2207/10021;
  (Continued)

(56) References Cited

FOREIGN PATENT DOCUMENTS

WO    2014202258 A1    12/2014

OTHER PUBLICATIONS

Davison et al., "Mobile Robot Localisation using Active Vision", Proc 5th European Conference on Computer Vision, Freiburg, Germany, 1998; pp. 1-17 (Springer LNCS vol. 1407, vol. II). (Year: 1998).*

(Continued)

*Primary Examiner* — Brian Werner
(74) *Attorney, Agent, or Firm* — EIP US LLP

(57) ABSTRACT

Certain examples described herein relate to modelling a three-dimensional space. Image data from at least one capture device is used to generate a three-dimensional model of the three-dimensional space. In certain examples, the three-dimensional model is segmented into active and inactive portions based on at least one model property. The examples are configured to use the active portions to update the three-dimensional model over time. Registration is also performed to align active portions of the three-dimensional model with inactive portions of the three-dimensional model over time. The registration aligns active portions of the three-dimensional model generated following an observation of a region of the three-dimensional space with inactive portions of the model generated following at least one previous observation of said region.

23 Claims, 8 Drawing Sheets

(52) U.S. Cl.
CPC ........... *G06T 2207/10016* (2013.01); *G06T 2207/10024* (2013.01); *G06T 2207/10028* (2013.01); *G06T 2207/30244* (2013.01)

(58) Field of Classification Search
CPC . G06T 2207/10028; G06T 2207/30244; G06T 17/00–17/30; G06T 19/00–19/20; G06F 3/04815
See application file for complete search history.

(56) References Cited

OTHER PUBLICATIONS

Henry et al., "RGB-D mapping: Using Kinect-style depth cameras for dense 3D modeling of indoor environments", The International Journal of Robotics Research 31(5) 647-663, copyright 2012, pp. 647-663. (Year: 2012).*
Zhou Qian-Yi et al.: "Elastic Fragments for Dense Scene Reconstruction", 2013 IEEE International Conference on Computer Vision, IEEE, Dec. 1, 2013 (Dec. 1, 2013) , pp. 473-480.
Khairuddin Alif Ridzuan et al. "Review on Simultaneous localization and mapping (SLAM)", 2015 IEEE International Conference on Control System, Computing and Engineering. Nov. 27, 2015 pp. 85-90.
Maik Keller et al. "Real-Time 3D Reconstruction in Dynamic Scenes Using Point-Based Fusion", International Conference on 3D Vision. Jun. 29, 2013 pp. 1-8.
Richard A. Newcombe et al. "KinectFusion: Real-time Dense Surface Mapping and Tracking", Mixed and Augmented Reality (ISMAR) 2011, 10th IEEE International Symposium on Oct. 26, 2011 pp. 127-136.
T. Whelan, M. Kaess, H. Johannsson, M.F. Fallon, J.J. Leonard and J.B. McDonald, "Real-time Large Scale Dense RGB-D SLAM with Volumteric Fusion". Published in International Journal if Robotics Research 2014.
Glocker et al. "Realtime RGB-D camera relocalization via randomized ferns for keyframe encoding." TVCG, Sep. 2014.
Whelan et al., "Kintinuous: Spatially Extended KinectFusion", RSS Workshop on RGB-D Advanced Reasoning with Depth Cameras. Jul. 2012: Sydney, Australia. http://www.thomaswhelan.ie/Whelan12rssw.pdf (accessed Dec. 11, 2015).
"Surfels: Surface elements as rendering primitives". Published in 27th Annual Conference on Computer graphics and Interactive techniques, ACM Press/Addison-Wesley Publishing Co., Jul. 2000.
International Search Report dated Oct. 10, 2016 for related application No. PCT/GB2016/051423, filed May 17, 2016.
United Kingdom Combined Search and Examination Report dated Nov. 13, 2015 on related Application No. GB1509068.1 filed May 27, 2015.

* cited by examiner

MODELLING A THREE-DIMENSIONAL SPACE

CROSS-REFERENCE TO RELATED APPLICATIONS

This application is a continuation under 35 U.S.C. § 120 of International Application No. PCT/GB2016/051423, filed May 17, 2016, which claims priority to United Kingdom Application No. GB1509068.1, filed May 27, 2015, under 35 U.S.C. § 119(a). Each of the above-referenced patent applications is incorporated by reference in its entirety.

BACKGROUND OF THE INVENTION

Field of the Invention

The present invention relates to modelling a three-dimensional space. The invention has particular, but not exclusive, relevance to generating or updating a three-dimensional model of a three-dimensional space using image data from a capture device.

Description of the Related Technology

In the field of computer vision and robotics, there is often a need to construct a representation of a three-dimensional space. Constructing a representation of a three-dimensional space allows a real-world environment to be mapped to a virtual or digital realm, where it may be used and manipulated by electronic devices. For example, a moveable robotic device may require a representation of a three-dimensional space to allow simultaneously location and mapping, and thus navigation of its environment. Alternatively, a representation of a three-dimensional space may enable three-dimensional models of objects within that space to be identified and/or extracted. These may be used to perform measurements on a real-world environment and/or used to produce three-dimensional replications, e.g. via additive manufacturing systems. Similarly, detection of parts of the human body in a three-dimensional space may enable novel man-machine interactions, enabling virtual representations of objects to be manipulated using actions in the physical world.

There are several techniques available for constructing a representation of a three-dimensional space. For example, structure from motion and multi-view stereo are two techniques that may be used to do this. Many techniques extract features from images of the three-dimensional space, such as corners and/or edges, e.g. using Scale Invariant Feature Transforms (SIFT) and/or Speeded Up Robust Features (SURF) algorithms. These extracted features may then be correlated from image to image to build a three-dimensional representation. Certain techniques that use a reduced number of points or features to generate a representation are referred to as "sparse" techniques. For example, these techniques may use ten to a hundred features and/or points to generate the representation. These may be contrasted with "dense" techniques that generate representations with many thousands or millions of points. "Sparse" techniques have an advantage that they are easier to implement in real-time, e.g. at a frame rate of 30 frames-per-second or so; using a limited number of points or features limits the extent of the processing that is required to construct the three-dimensional representation. Comparatively it is more difficult to perform real-time "dense" mapping of a three-dimensional space due to computational requirements. For example, it is often preferred to carry out a "dense" mapping of a three-dimensional space off-line, e.g. it may take 10 hours to generate a "dense" representation from 30 minutes of provided image data.

When generating a representation of a three-dimensional space from a moving capture device, there are the challenges of determining the position and orientation of the capture device within the space, and of dealing with unpredictable motion, e.g. extended "choppy" or "loopy" motion. For example, non-even terrain or a hand-held capture device may result in frequent changes in capture device position and orientation, and an autonomous robotic device may revisit previously captured locations within the three-dimensional space. The capture of image data may also be continuous in real-time, resulting in large amounts of captured data. These factors all present a challenge for real-world systems; many techniques may show success with limited data or tightly-defined capture trajectories but struggle with constructing a representation in real-time from an autonomous robotic device or mobile computing device.

In the paper Real-time Large Scale Dense RGB-D SLAM with Volumetric Fusion by T. Whelan, M. Kaess, H. Johannsson, M. F. Fallon, J. J. Leonard and J. B. McDonald published in the International Journal of Robotics Research in 2014, a voxel-based space domain is defined, wherein a pose graph and cloud slices are used to construct a volumetric model. SURF descriptors are used together with a bag-of-words based loop detector for place recognition.

Similarly in WO2014/202258 a method for mapping an environment is described wherein a pose graph is generated, each node of the pose graph comprising a respective cloud slice.

SUMMARY

According to one aspect of the present invention there is provided an apparatus for generating a model of a three-dimensional space comprising: an image acquisition interface configured to obtain image data provided by a capture device, said image data representing an observation where there is relative movement between the three-dimensional space and the capture device over time; and a model engine configured to process the image data obtained by the image acquisition interface and to compute a three-dimensional model of the three-dimensional space, wherein the model engine comprises: a model segmenter configured to segment the three-dimensional model into at least active and inactive portions based on at least one model property, wherein the model engine is configured to use active portions of the three-dimensional model to update said model over time; and a registration engine configured to align active portions of the three-dimensional model with inactive portions of the three-dimensional model over time.

The model engine may be configured to compute an active model frame based on a projection from the active portions of the three-dimensional model for use in updating the three-dimensional model. For example, a frame-to-model tracking component may be configured to compare the active model frame to a provided frame from said image data to determine an alignment of the active portions of the three-dimensional model with the image data. The frame-to-model tracking component may be further configured to estimate a pose of the capture device by comparing the provided frame at a current time with the active model frame at a previous time, the pose of the camera device representing a position and orientation of the capture device in the three-dimensional space.

In certain cases, the registration engine is configured to compute an inactive model frame based on a projection from the inactive portions of the three-dimensional model, determine a deformation that aligns the active model frame with the inactive model frame, and update the three-dimensional model using the deformation.

The three-dimensional model may comprise a surface element model. In this case each surface element in the surface element model may comprise at least data defining a position of the surface element in three-dimensions and data defining a normal vector for the surface element in three-dimensions, wherein each surface element represents a two-dimensional area in the three-dimensional space.

The model engine may be configured to store representations of the three-dimensional model over time. In this case the registration engine may be configured to determine if a representation of the three-dimensional model at a given time matches a stored representation of three-dimensional model for a previous time and, responsive to a positive determination, align the representation of the three-dimensional model at the given time with the stored representation of three-dimensional model for the previous time. The registration engine may also be configured to use a deformation graph to align active portions of the three-dimensional model with inactive portions of the three-dimensional model, the deformation graph being computed based on an initialisation time for positions in the three-dimensional model, the deformation graph indicating a set of neighbours for a given position in the three-dimensional that are to be used to modify the three-dimensional model at the given position during alignment.

In certain case, the at least one model property comprises one of a time of model generation and model update for a given position in the three-dimensional model, wherein the inactive portions are indicative of a past observation time that differs from a current observation time by more than a predefined amount.

According to a second aspect of the present invention there is provided a method of updating a model of a three-dimensional space comprising: obtaining a three-dimensional model of the three-dimensional space; segmenting the three-dimensional model into at least active and inactive portions based on at least one model property; obtaining image data representing an observation of the three-dimensional space following relative motion of a capture device with respect to the three-dimensional space; updating the three-dimensional model based on the obtained image data and active portions of the three-dimensional model; and registering active portions of the three-dimensional model with corresponding inactive portion of the three-dimensional model, wherein said registering aligns active portions of the three-dimensional model generated following an observation of a region of the three-dimensional space with inactive portions of the model generated following at least one previous observation of said region.

In one case, updating the three-dimensional model comprises estimating a pose of the capture device by comparing data for a provided frame of said image data with predicted data for a model frame, the model frame being derived from active portions of the three-dimensional model of the three-dimensional space. In this case, registering the active portions of the three-dimensional model with the inactive portion of the three-dimensional model may comprise determining predicted renderings of the three-dimensional model for the active and inactive portions using the pose of the capture device, and transforming the active portions such that the predicted renderings are aligned.

In certain examples, the image data comprises at least depth data indicating a distance from the capture device for a plurality of image elements. In this case, estimating the pose of the capture device comprises comparing at least depth data for a provided frame of said image data with predicted depth data for a model frame. In this or other examples, the image data may also comprise at least colour data for a plurality of image elements. In this case, estimating the pose of the capture device comprises comparing at least colour data for a provided frame of said image data with predicted colour data for a model frame. In certain cases, the image data comprises at least depth data and colour data for a plurality of image elements. Estimating the pose of the capture device may further comprise minimising an error function, the error function being a function of: a geometric error based on a comparison of depth data for a provided frame of said image data with predicted depth data for a model, and a photometric error based on a comparison of colour data for a provided frame of said image data with predicted colour data for a model frame.

In the method, registering the active portions of the three-dimensional model with the inactive portions of the three-dimensional model may comprises performing a local loop registration if an alignment metric between active portions of the three-dimensional model for a given frame and inactive portions of the three-dimensional model for the given frame indicates a misalignment below a predefined threshold. The process of updating may also comprise storing a representation of the three-dimensional model and performing a global loop registration if a current representation of the three-dimensional model matches a previously-stored representation of the three-dimensional model. In these cases, the representation of the three-dimensional model may comprise a lower resolution representation of a predicted frame, the predicted frame being determined based on a projection from the active portions of the three-dimensional model. Registration may comprise non-rigidly deforming the active portions of the three-dimensional model based on a geometric alignment between predicted frame data for the active and inactive portions.

As discussed above the three-dimensional model may comprise a surface element model and segmenting the three-dimensional model may be based on one or more of: a time of model generation for a given position in the three-dimensional model, a time of model update for a given position in the three-dimensional model, and a determined distance between a given position in the three-dimensional model and the capture device.

According to a third aspect of the present invention there is provided a robotic device comprising: at least one capture device arranged to provide a plurality of frames comprising one or more of depth data and colour data, said depth data indicating a distance from the capture device for a plurality of image elements; the apparatus of any of the examples presented above, wherein the image acquisition interface is communicatively coupled to the at least one capture device; one or more movement actuators arranged to move the robotic device with the three-dimensional space; and a navigation engine arranged to control the one or more movement actuators, wherein the navigation engine is configured to access the three-dimensional model generated by the model engine to navigate the robotic device within the three-dimensional space.

According to a fourth aspect of the present invention there is provided a mobile computing device comprising: at least one capture device arranged to record a plurality of frames comprising one or more of depth data and colour data, said depth data indicating a distance from the capture device for a plurality of image elements, and the apparatus of any of the examples presented above, wherein the image acquisition interface is communicatively coupled to the at least one capture device.

According to a fifth aspect of the present invention there is provided a non-transitory computer-readable storage medium comprising computer-executable instructions which, when executed by a processor, cause a computing device to perform a method of generating a model of a three-dimensional space, the method comprising: obtaining image data comprising a plurality of frames, each frame comprising depth data and colour data, said depth data indicating a distance of an object in the three-dimensional space from an imaging device used to capture the image data; and computing a model of the three-dimensional space based on the image data, the model comprising a plurality of elements, each element having a position in three-dimensions, wherein said computing comprises: segmenting the model into active and inactive portions based on at least one observation property for each portion; for a given frame in the image data: determining an estimated pose of the imaging device by comparing the depth data and colour data for the given frame with predicted depth and colour data for a model frame derived from the active portions of the model; updating the predicted depth and colour data for the model frame using the estimated pose of the imaging device; aligning the active portions of the model with the inactive portions of the model by transforming elements associated with at least one of the active and inactive portions of the model; and updating the aligned active portions of the model using the depth data and colour data for the given frame. A non-transitory computer-readable storage medium computer-executable instructions which, when executed by a processor, cause a computing device to perform any of the methods discussed above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1A:
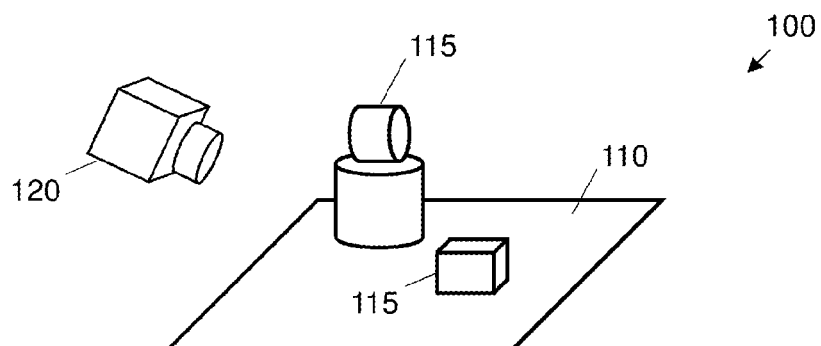
FIG. 1A is a schematic diagram showing a first example of a three-dimensional space.

Certain examples described herein enable detailed three-dimensional models or maps of a three dimensional space to be generated from captured image data. These examples enable an accurate model of such a space to be generated even when the image data results from a variety of capture device trajectories. For example, dense, consistent and comprehensive models of a three-dimensional space may be generated from "loopy" and/or "choppy" capture device trajectories as well as from guided and stable forward-facing trajectories. Moreover, certain examples described herein comprise features that enable these three-dimensional models to be constructed in real-time or at near real-time frame rates. For example, certain features enable incremental simultaneous localisation and dense mapping on a frame-by-frame basis. This enables the techniques presented herein to be used in a variety of real-world electronic devices, from handheld mobile computing devices to autonomous domestic and/or industrial robotics. The increased accuracy and stability of the generated three-dimensional model also enables improved interactions between robotic devices and their environments, as such devices can be more confident in the applicability of their internal representations.

In certain examples described herein a three-dimensional model or map (or simply a "model") is segmented into at least active and inactive portions based on at least one property of the model. For example, positional elements of such a model may be classified as active or inactive based on a time of model modification, e.g. older parts of the model may be classified as inactive, and/or a distance from a capture device within the three-dimensional space, e.g. positional elements that are over a certain distance from the capture device or a defined location in space may be classified as inactive. In these cases, active portions of the three-dimensional model are used to update said model, wherein inactive portions are not used to update the model. This updating may comprise fusing frames of image data with the model, e.g. determining new positional elements in the model from the image data. This helps to reduce computational demands as only a subset of a model of a space may be used at any one time to update the model following new observations of the space. In addition to updating the model, the active portions may also be used in a tracking operation that seeks to determine an accurate current representation of the location and orientation of the capture device in relation to the model. Again, using only a subset of the model of the space enables computational demands to be reduced, as compared to tracking based on a full model of the space.

Certain examples described herein also provide for alignment of active and inactive model portions. This enables so-called "loop" closures when a capture device revisits or re-observes a given location within the three dimensional space. This alignment, which may be performed as frequently as on a frame-by-frame basis as captured image data is processed, helps maintain the accuracy and stability of the model and provides the ability to cope with "loopy" and/or "choppy" capture device trajectories. In certain cases this alignment may incorporate two aspects: a "local loop closure" that attempts to align predicted frames generated from each of the active and inactive models; and a "global loop closure" that attempts to align a given frame of image data with a representation of a previously-processed frame of image data. Alignment may be performed by deforming the three-dimensional model, e.g. via a space deformation. In certain cases, this deformation may be non-rigid and may use a deformation graph to apply a transformation to positional elements of the model. This may further increase the accuracy and consistency of the model in three-dimensions, e.g. by reducing discontinuities that are constructs of the modelling process and that do not reflect the three-dimensional space being modelled. In particular, such a deformation graph may be sparse and/or may be embedded in the space, e.g. be associated with the positional elements of the model. These techniques differ from those that require a pose graph, e.g. a probabilistic representation of the location and orientation of the camera device, which is used to rigidly transform independent key frames of image data.

Figure 1B:
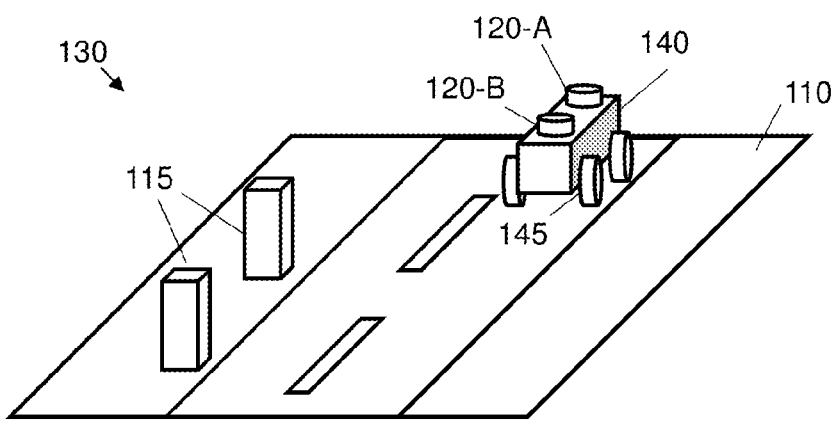
FIG. 1B is a schematic diagram showing a second example of a three-dimensional space.
Figure 1C:
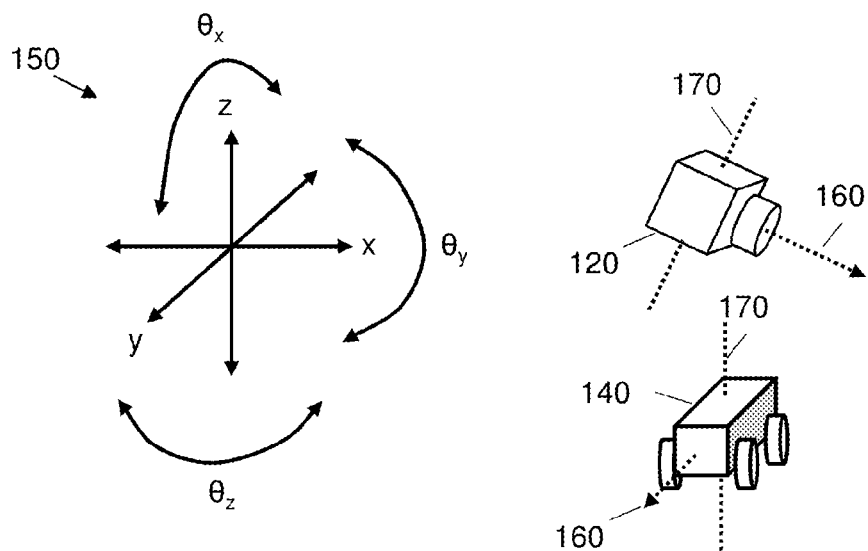
FIG. 1C is a schematic diagram showing available degrees of freedom for an example capture device.

FIGS. 1A, 1B and 1C schematically show examples of a three-dimensional space and the capture of image data associated with that space. These examples are presented to better explain certain features described herein and should not be considered limiting; certain features have been omitted and simplified for ease of explanation.

FIG. 1A shows a first example 100 of a three-dimensional space 110. The three-dimensional space 110 may be an internal and/or an external physical space, e.g. at least a portion of a room or geographical location. The three-dimensional space 110 in this example 100 comprises a number of physical objects 115 that are located with the three-dimensional space. These objects 115 may comprise one or more of, amongst others: people, electronic devices, furniture, animals, building portions and equipment. The first example 100 also shows a capture device 120 that is capturing image data associated with the three-dimensional space 110. The capture device 120 may comprise a camera, either in digital or analogue form, that is arranged to record data that results from observing the three-dimensional space 110. In certain cases, the capture device 120 is moveable, e.g. may be arranged to capture different scenes corresponding to different observed portions of the three-dimensional space 110. The capture device 120 may be moveable with reference to a static mounting, e.g. may comprise actuators to change the position and/or orientation of the camera with regard to the three-dimensional space 110. In another case, the capture device 120 may be a handheld device operated and moved by a human user; in yet another case, the capture device 120 may be coupled to a robotic device that is arranged to move within the three-dimensional space 110, e.g. comprise an autonomous aerial and/or terrestrial mobile device. The capture device 120 may be statically or moveably mounted on such a device. Although the three-dimensional space 110 in FIG. 1A is shown with a lower surface this need not be the case in all implementations, for example an environment may be aerial or within extra-terrestrial space.

FIG. 1B shows a second example 130 of a three-dimensional space 110. In the second example 130, the three-dimensional space 110 is an external space, which may comprise a location on a planet. In the second example 130, the external space comprises a portion of track or road that has a number of roadside objects 115. The second example 130 shows a mobile device 140 that is arranged to navigate the three-dimensional space 110 using actuators 145. In the present example, these actuators comprise wheels; in other cases they may comprise tracks, burrowing mechanisms, rotors, etc. The mobile device 140 comprises two capture devices 120-A and 120-B. Each capture device 120-A,B may capture a different type of image data and/or may comprise a stereo image source. In one case, capture device 120-A may capture depth data, e.g. using a remote sensing technology such as infrared, ultrasound and/or radar (including Light Detection and Ranging—LIDAR technologies), while capture device 120-B captures photometric data, e.g. colour or grayscale images (or vice versa). In one case, one or more of the capture devices 120-A, B may be moveable independently of the mobile device 140. In one case, one or more of the capture devices 120-A, B may be mounted upon a rotating mechanism, e.g. that rotates in an angled arc and/or that rotates by 360 degrees, and/or arranged with adapted optics to capture a panorama of a scene (e.g. up to a full 360 degree panorama).

FIG. 1C shows an example 150 of degrees of freedom available to the capture device 120 and the mobile device 140. In the case of capture device 120, a direction of the device 160 may be co-linear with the axis of a lens or other imaging apparatus. As an example of rotation about one of the three axes, a normal axis 170 is shown in the Figures. Similarly, in the case of mobile device 140, a direction of alignment of the mobile device 160 may be defined. This may indicate a facing of the mobile device and/or a direction of travel. A normal axis 170 is also shown. Although only a single normal axis is shown with reference to the capture device 120 or mobile device 140, these devices may rotate around any one or more of the axes shown schematically as 150 as described below.

More generally, an orientation and location of a capture device may be defined in three-dimensions with reference to six degrees of freedom: a location may be defined within each of the three dimensions, e.g. by an [x, y, z] co-ordinate, and an orientation may be defined by an angle vector representing a rotation about each of the three axes, e.g. [$\theta_x$, $\theta_y$, $\theta_z$]. In certain implementations, a capture device may be defined with reference to a restricted set of these six degrees of freedom, e.g. for a capture device on a ground vehicle the z-dimension may be constant. In certain implementations, such as that of mobile device 140, an orientation and location of a capture device coupled to another device may be defined with reference to the orientation and location of that other device, e.g. may be defined with reference to the orientation and location of mobile device 140. In examples described herein the orientation and location of a capture device is defined as the pose of the capture device. The pose of a capture device may vary over time, such that a capture device may have a different pose at a time t+1 than at a time t. In a case of a handheld mobile computing device comprising a capture device, the pose may vary as the handheld device is moved by a user within the three-dimensional space 110.

Figure 2A:
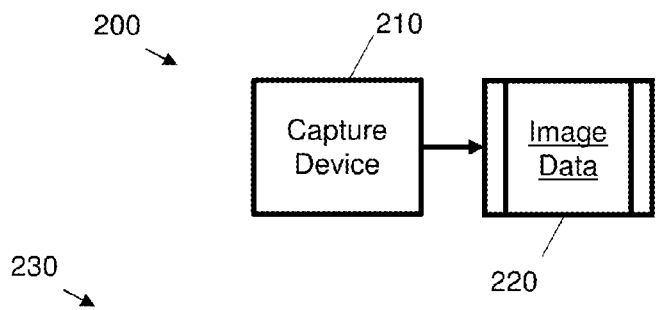
FIGS. 2A to 2C are schematic diagrams showing example capture devices.
Figure 2B:
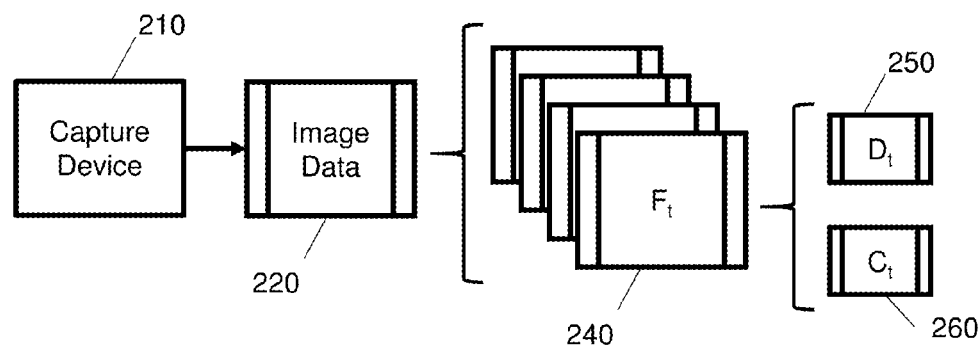
Figure 2C:
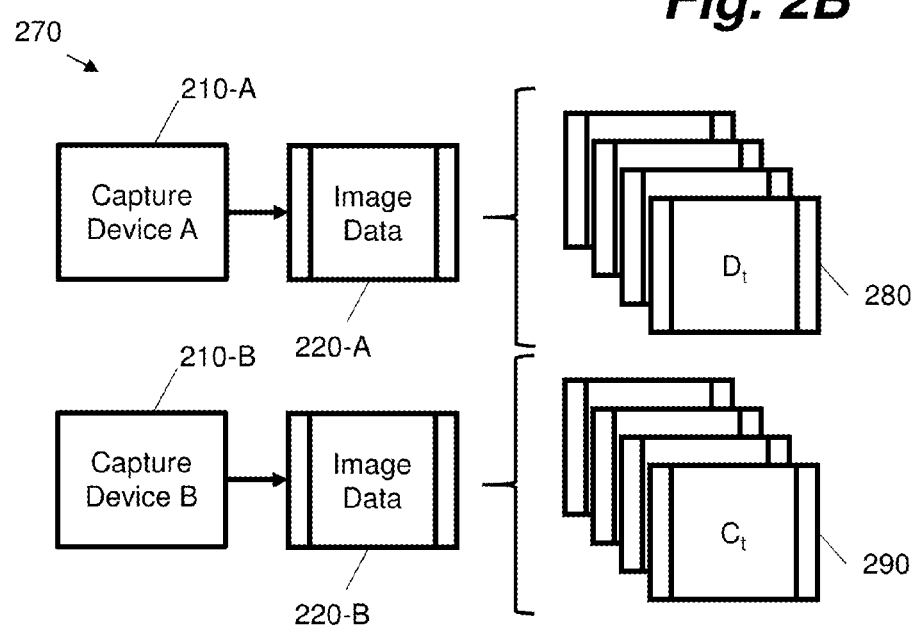

FIGS. 2A, 2B and 2C show schematically three non-exhaustive examples of different capture device configurations. In the example 200 of FIG. 2A, a capture device 210 is configured to generate image data 220. If the capture device 210 is a digital camera this may be performed directly, e.g. image data 220 may comprise processed data from a charge-coupled device or complementary metal-oxide-semiconductor (CMOS) sensor. It is also possible to generate image data 220 indirectly, e.g. through processing other image sources such as converting analogue signal sources.

In one case image data 220 comprises image data captured over time. One example 230 of this format is shown in FIG. 2B. In this case, the image data 220 comprises a plurality of frames 240. Each frame 240 may relate to a particular time t in a time period over which images of a three-dimensional space, such as 110 in FIG. 1, are captured (i.e. $F_t$). As such image data 220 may be considered video data. A frame 240 generally consists of a two-dimensional representation of measured data. For example, a frame 240 may comprise a two-dimensional array or matrix of recorded pixel values at time t. In the example of FIG. 2B, all frames 240 within the image data are the same size, although this need not be the case in all examples. Pixel values within a frame 230 represent a measurement of a particular portion of the three-dimensional space. In the example of FIG. 2B, each frame 240 comprises values for two different forms of image data. A first set of values relate to depth data 250 (e.g. $D_t$). The depth data may comprise an indication of a distance from the capture device, e.g. each pixel or image element value may represent a distance of a portion of the three-dimensional space from the capture device 210. A second set of values relate to photometric data 260 (e.g. colour data $C_t$). These values may comprise Red, Green, Blue pixel values for a given resolution. In other examples, other colour spaces may be used and/or photometric data 260 may comprise mono or grayscale pixel values. In one case, image data may comprise a compressed video stream or file. In this case, frames of image data may be reconstructed from the stream or file, e.g. as the output of a video decoder. Image data may be retrieved from memory locations following pre-processing of video streams or files.

The capture device 210 of FIG. 2B may comprise a so-called RGB-D camera that is arranged to capture both RGB data 260 and depth ("D") data 250. In one case, the RGB-D camera is arranged to capture video data over time. One or more of the depth data 250 and RGB data may be used at any one time. The depth data 250 may be generated by one or more techniques known in the art, such as a structured light approach wherein an infrared laser projector projects a pattern of infrared light over an observed portion of a three-dimensional space, which is then imaged by a monochrome CMOS image sensor. Examples of these cameras include the Kinect® camera range manufactured by Microsoft Corporation, of Redmond, Wash. in the United States of America, the Xtion® camera range manufactured by ASUSTeK Computer Inc. of Taipei, Taiwan and the Carmine® camera range manufactured by PrimeSense, a subsidiary of Apple Inc. of Cupertino, Calif. in the United States of America. In certain examples an RGB-D camera may be incorporated into a mobile computing device such as a tablet, laptop or mobile telephone. In other examples, an RGB-D camera may be used as a peripheral for a static computing device or may be embedded in a stand-alone device with dedicated processing capabilities. In one case, the capture device 210 may be arranged to store the image data 220 in a coupled data storage device. In another case, the capture device 210 may transmit image data 220 to a coupled computing device. The coupled computing device may be directly coupled, e.g. via a universal serial bus (USB) connection, or indirectly coupled, e.g. the image data 220 may be transmitted over one or more computer networks. In yet another case, the capture device 210 may be configured to transmit the image data 220 across one or more computer networks for storage in a network attached storage device. Image data 220 may be stored and/or transmitted on a frame-by-frame basis or in a batch basis, e.g. a plurality of frames may be bundled together. The depth data 240 need not be at the same resolution or frame-rate as the photometric data 250. For example, the depth data 250 may be measured at a lower resolution than the photometric data 260. One or more pre-processing operations may also be performed on the image data 220 before it is used in the later-described examples. Further configurations not described herein are also possible.

FIG. 2C shows another possible configuration 270 to obtain image data 220. In this example, two capture devices are used: a first capture device 210-A arranged to capture image data 220-A comprising frames of depth data 280; and a second capture device 210-B arranged to capture image data 220-B comprising frames of photometric data 290. These data channels may be processed separately in any computing device or merged into a common image processing pipeline. For example, the configuration 270 of FIG. 2C may apply to mobile device 140 in FIG. 1B that has two capture devices 120-A and 120-B. In one case, the first capture device 210-A may be an infrared, ultrasound and/or radar device arranged to measure (e.g. of depth in) a three-dimensional space and convert that measurement into frames of measurement data. The second capture device 210-B may then comprise an RGB camera arranged to capture frames of colour image data 290. The frame sizes and/or resolutions for the depth data 280 and photometric data 290 may differ, as may the frame rate of capture. In one case, pre-processing may be applied such that the two frame sets have a common size and resolution. In this case, the data of FIG. 2C may be pre-processed such that it is in the form shown in FIG. 2B.

In certain cases, the capture device may be arranged to perform pre-processing to generate depth data. For example, a hardware sensing device may generate disparity data or data in the form of a plurality of stereo images, wherein one or more of software and hardware are used to process this data to compute depth information. Similarly, depth data may alternatively arise from time of flight camera that output phase images that may be used to reconstruct depth information. As such any suitable technique may be used to generate depth data that forms part of image data 220.

FIGS. 2A, 2B and 2C are provided as a number of examples and, as will be appreciated, different configurations than those shown in the Figures may be used to generate image data 220 for use in the methods and systems described below. Image data 220 may further comprise any measured sensory input that is arranged in a two-dimensional form representative of a captured or recorded view of a three dimensional space with a capture device. For example, this may comprise just one of depth data or photometric data, electromagnetic imaging, ultrasonic imaging and radar output, amongst others. In these cases only an imaging device associated with the particular form of data may be required, e.g. an RGB device without depth data. In the examples above, the depth data $D_t$ may comprise a two-dimensional matrix of depth values. This may be represented as a grayscale image, e.g. where each [x, y] pixel value in a frame having a resolution of $x_{R1}$ by $y_{R1}$ comprises a depth value, d, representing a distance from the capture device of a surface in the three-dimensional space. The photometric data $C_t$ may comprise a colour image, where each [x, y] pixel value in a frame having a resolution of $x_{R2}$ by $y_{R2}$ comprises an RGB vector [R, G, B]. As an example, the resolution of both sets of data may be 640 by 480 pixels. In certain cases, image data 220 may be generated by combining multiple data sources, e.g. multiple cameras that are observing a particular three dimensional space. In certain cases, image data 220 need not be video data. It may instead comprise a series of still images captured from different locations over time using one or more capture devices. In certain cases, depth data may be generated from photometric data, e.g. from processing photometric data representative of motion of the capture device around a space.

Figure 3:
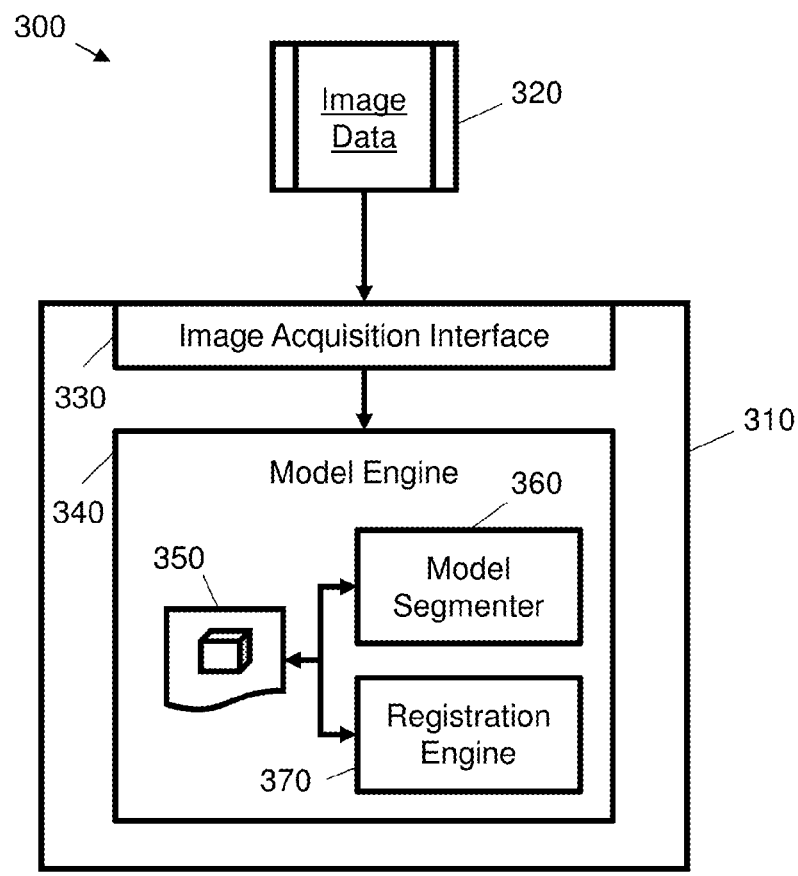
FIG. 3 is a schematic diagram of an apparatus for generating a model of a three-dimensional space according to an example.

FIG. 3 shows an example 300 of an apparatus 310 for generating a model of a three dimensional space. For example, this may be a model of three-dimensional space 110 shown in FIGS. 1A and 1B. The apparatus 310 processes image data 320. Image data 320 may be generated by, for example, any of the configurations shown in FIGS. 2A, 2B and 2C.

In FIG. 3 the apparatus comprises an image acquisition interface 330 and a model engine 340. The image acquisition interface 330 is configured to obtain image data 320. This may be image data that is actively, or has been previously, been generated by a capture device, such as capture devices 120 and 210 in the previous Figures. The image data 320 is associated with an observation of the three-dimensional space using the capture device over time. For example, the image data 320 may comprise video data over a given time period, wherein over the given time period one or more capture devices are moved around the three-dimensional space. The model engine 340 is configured to process the image data 320 obtained by the image acquisition interface 330 and to compute a three-dimensional model 350 of the three-dimensional space. In this example, the model engine 340 in turn comprises at least a model segmenter 360 and a registration engine 370. The model segmenter 360 is configured to segment the three-dimensional model 350 into at least active and inactive portions based on at least one model property. The registration engine 370 is configured to align active portions of the three-dimensional model 350 with inactive portions of the three-dimensional model 350 over time. The model engine 340 is further configured to use active portions of the three-dimensional model 350 to update said model over time, i.e. the inactive portions are not used to update the model.

The configuration of the image acquisition interface 330 may depend on the implementation. In one case, the image acquisition interface 330 may comprise a hardware interface, such as a USB or network interface, and computer program code implementing software drivers. In one case, the model engine 340 may be configured to operate on streaming data received over the image acquisition interface 330. This may be the case when the apparatus 310 operates on live image data. In one case, the image acquisition interface 330 may be communicatively coupled to a capture device and be arranged to store image data 320 received from the capture device in one or more of persistent and non-persistent data storage, e.g. frames of data may be copied into memory and/or may be stored in a hard disk drive or solid state storage. In another case, image data 320 may be stored externally to the apparatus 310 in a given file format, e.g. in one or more files accessible in a data storage device. In this case, image acquisition interface 330 may use or implement part of a file system to at least read data from the one or more files. This may be the case when the apparatus 310 operates on previously-recorded image data. For example, the image data 320 may comprise a recording of a user walking through a building as captured using a handheld device or it may comprise a scouting trajectory of a geographic space by an autonomous vehicle. Further configurations are envisaged and these examples should not be seen as limiting.

The model engine 340 may comprise dedicated processing electronics and/or may be implemented by way of computer program code executed by a processor of at least one computing device. In cases such as that described with reference to FIG. 4 below, the model engine 340 may comprise one or more embedded computing devices. This may comprise at least one processor operating in association with memory to execute computer program code loaded onto a computer readable medium. This medium may comprise solid state storage such as an erasable programmable read only memory and the computer program code may comprise firmware. In other cases, the model engine 340 may comprise a suitably configured system-on-chip, application-specific integrated circuit and/or one or more suitably programmed field-programmable gate arrays. In one case, the model engine 340 may be implemented by way of computer program code and/or dedicated processing electronics in a mobile computing device and/or a desktop computing device. In one case, the model engine 340 may be implemented, as well as or instead of the previous cases, by one or more graphical processing units executing computer program code. In certain cases, the model engine 340 may be implemented by way of one or more functions implemented in parallel, e.g. on multiple processors and/or cores of a graphics processing unit.

The three-dimensional model 350 generated by the model engine 340 may comprise any model or map having positional elements representative of positions or locations within the three-dimensional space associated with the image data. In certain cases, the three-dimensional model 350 is a "dense" model of the three-dimensional space. In this case, there are a large number of positional elements forming the model, e.g. hundreds of thousands or millions of elements. This may be compared to a feature-based or "sparse" model wherein there may only be tens or hundreds of defined model points. In one case, the positional elements may be based on a voxel model of the space, wherein surfaces with the space are defined with reference to voxel values within a voxel space of a particular resolution in three dimensions. In another case, a surface element model may be used. The surface element model is defined in more detail with reference to FIGS. 6A and 6B. In a surface element model a number of orientated surfaces at particular positions are defined as positional elements. The extent of the three-dimensional model 350 may depend on the observed extent of the three-dimensional space as represented in the image data 320.

In one case, the three-dimensional model 350 may be deemed "dense" as pixel values within image data 320 are processed and contribute to the modelling of the three-dimensional space. For example, in a "dense" representation every pixel in the image may contribute as much information as possible to the tracking and mapping estimation procedure. This enables a three dimensional model, i.e. a resulting representation of a map of a scene, to be projected back into a synthetic capture device or camera to reconstruct a "dense" image, i.e. an image at the resolution of the capture device where the vast majority of pixels in the synthesised image have data synthesised based on information stored with the model. In contrast, a "sparse" system, e.g. one that utilises key-points or extracted features, only uses a small subset of pixel values in the image data to generate a model. In the "sparse" case, a synthesised images cannot be created at a capture device resolution, as there is not enough information within the model. In this manner, a "dense" system acts to estimate one or more surfaces within a three-dimensional space with high accuracy, e.g. within a given tolerance of a real environment. A "dense" system may be considered as analogous to a quantized continuous system, whereas "sparse" systems operate on small sets of discrete points.

In certain cases, the model engine 340 is configured to operate on a frame-by-frame basis. In one implementation, the model engine 340 may be arranged to load successive frames $F_t$ of image data into memory. These frames may be stored in data storage internal to the apparatus 310 or obtained from external data storage by image acquisition interface 330. In other implementations, the model engine 340 may retrieve one or more frames of image data from memory internal to the apparatus 310. In one implementation, a portion of internal memory may hold frame data at a particular time t and may be overwritten as new image data 320 is received from a capture device by the image acquisition interface 330. When the model engine 340 is configured to operate on a frame-by-frame basis, the model engine 340 may be configured to update the three-dimensional model 350 on a frame-by-frame basis. This may comprise "fusing" a particular frame of image data 320 with the three-dimensional model 350, i.e. using the frame of image data 320 to modify and update the three-dimensional model 350. This may comprise including new positional elements that may be derived from the frame of image data 320. Certain specific examples of how the three-dimensional model 350 may be generated or updated are discussed in more detail below. It should be noted that the approaches discussed herein may be applied to frames of image data that are incomplete and/or noisy.

In one case, the model engine 340 is configured to track a pose of a capture device using the image data 320 and the three-dimensional model 350. This need not necessarily relate to an actual pose of a particular capture device; in certain examples, it may be a pose of a virtual capture device that is estimated based on a particular frame of image data 320. For example, each frame of image data 320 may be considered to be captured using a particular capture device at a particular location and having a particular orientation at the time the frame was captured. Where two or more capture devices are used, the pose of each capture device may be tracked using corresponding image data from each capture device. The model engine 340 may be configured to track a given frame of image data 320 in relation to the three-dimensional model 350. This may comprise determining what portion of the three-dimensional model 350 is being observed within the given frame of image data 320. This may be achieved using a pose estimate that is generated based on a frame of image data 320 and the three-dimensional model 350. In certain cases, rather than or as well as generating a pose estimate based on image data 320, a pose estimate may be generated based on measurement data from an external source. For example, electro-mechanical measurements from a moveable capture device mounting, such as a mechanical arm with controllable and/or measurable degrees of freedom, may be processed to determine a pose estimate for a capture device coupled to the mounting.

The model segmenter 360 may be configured to segment the three-dimensional model 350 by modifying model data. For example, in one case a given positional element of the three-dimensional model 350 may have a variable indicating whether it forms part of the active portions or the inactive portions of the model. In another case, the model segmenter 360 may be configured to segment the three-dimensional model 350 as a function applied to said model. For example, the three-dimensional model 350 may be input to the model segmenter 360 and the model segmenter 360 may be configured to output one or more of active portions and inactive portions of the three-dimensional model 350. Either approach may be used.

A model property used by the model segmenter 360 to segment the three-dimensional model 350 may be indicative of a level of certainty in the three-dimensional model 350. For example, the model segmenter 360 may segment the three-dimensional model 350 based on one or more of time and distance. In the first case, the model property may comprise one of a time of model generation and a time of model update for a given position in the three-dimensional model. In this case the inactive portions may be indicative of a past observation time that differs from a current observation time by more than a predefined amount. For example, the model segmenter 360 may be arranged to process time data for each positional element making up the three dimensional model 350 to divide the set of positional elements for the three-dimensional model 350 into two disjoint sets θ, representing active elements, and Ψ, representing inactive elements. To do this the model segmenter 360 may process a timestamp $t_P$ for each positional element (e.g. a time of the positional element was last modified) such that, for a given time of segmentation t (e.g. relating to a particular processed frame of image data $F_t$), each positional element in the model $P_c$ (where c is a co-ordinate in three-dimensional space), a positional element is in the set θ (i.e. $P_c \in \theta$) if $t - t_P < \delta_t$, and a positional element is in the set Ψ (i.e. $P_c \in \Psi$) if $t - t_P \geq \delta_t$, where $\delta_t$ is a defined period of time. This form of segmentation or model element classification gradually labels positional elements that have not been seen in a period of time $\delta_t$ as inactive. It may be considered an application of a time window. As described above, the model engine 360 may be configured to fuse new frames of image data into the active portions of the three-dimensional model 350, wherein the inactive portions of the model are not used for tracking and/or data fusion. In this case, following alignment of active and inactive portions by the registration engine 370, the inactive portions that are aligned may be modified such that they now become active portions. For example, on alignment of inactive portions, the registration engine 370 may update a time of last modification associated with each positional element in the inactive portions. This may have an effect that this aligned inactive portions now become active following processing of the three-dimensional model 350 by the model segmenter 360. This enables continuous frame-to-model tracking and also model-to-model tracking, and allows for viewpoint-invariant loop closures.

In one case, the model engine 340 is configured to compute an active model frame based on a projection from the active portions of the three-dimensional model 350 for use in updating the model. For example, such a projection may provide a two-dimensional viewpoint or virtual frame representing a predicted view or observation of the active portions of the three-dimensional model 350. In one case, the active model frame may be generated based on a pose estimate of a capture device at a given time. For example, the pose estimate may indicate the location and orientation of the viewpoint or virtual frame such that a geometric projection from the active portions of the three-dimensional model 350 may be computed. In one case, predicted frames may be calculated for each data set making up the image data 320. For example, when processing image data similar to that shown in FIGS. 2B and 2C, each active model frame may comprise a predicted frame of depth data, $\hat{D}_t^a$, and a predicted frame of photometric data, $\hat{C}_t^a$. These may be of the same resolution as a recorded or captured image frame $F_t$ from the image data 320. Use of an active model frame is described in more detail with reference to FIG. 5 below.

As described above, the apparatus 310 may be arranged to generate the three-dimensional model 350 over time, e.g. as a plurality of frames of recorded image data 320 are processed. In one case, the image data 320 is representative of an observation of the three-dimensional space over time using a moving capture device; as such, as frames of image data 320 are processed by the model engine 340, the three-dimensional model 350 grows in size, e.g. incorporates more positional elements representing different portions of the three-dimensional space. Moreover, the registration engine 370 is configured to perform alignment of active and inactive portions of the model over time; this may occur as portions of the three-dimensional space are revisited or re-observed, i.e. as "loops" in the motion of the capture device are closed. This means that the accuracy and consistency of the three-dimensional model 350 also increases as more frames of image data 320 are processed.

An output of the apparatus 310 may be considered to comprise the three-dimensional model 350 of the observed three-dimensional space. This model 350 may comprise at least positional elements defined with reference to three-dimensions. Each positional element may further be associated with data that indicates the presence of solid surfaces within the three-dimensional space. For example, in a voxel-based model a surface may be represented as a zero value or crossing point for a variable representing free-space; in a surface element model, positional elements may be defined for surfaces within the three-dimensional space, as such each positional element may indicate a particular surface within the model. In any case, the three-dimensional model 350 of the observed three-dimensional space may be used in a variety of ways. If the apparatus 310 forms part of a handheld mobile computing device, the three-dimensional model 350 may comprise a mapping of the three-dimensional space following capture of image data as the device is moved around the space. If the apparatus 310 is communicatively coupled to one or more capture devices that are statically mounted but arranged to pan around to observe an environment, the three-dimensional model 350 may be used to measure for the presence of objects, e.g. such as 115 in FIG. 1, within the space. In one particular example, the three-dimensional model 350 may be used by a user-interface system to determine the location of human beings, and/or portions of human beings, wherein said location may be used as a user input for the interface. In another example, the three-dimensional model 350 may be used as an input to an additive manufacturing pipeline, wherein objects within the model may be generated by an additive manufacturing system, e.g. using the definition of the positional elements within the model. In one case, the three-dimensional model 350 may be accessed from a location that is remote from the capture device, wherein the model represents an observation of a space, e.g. in real-time or near real-time.

Figure 4:
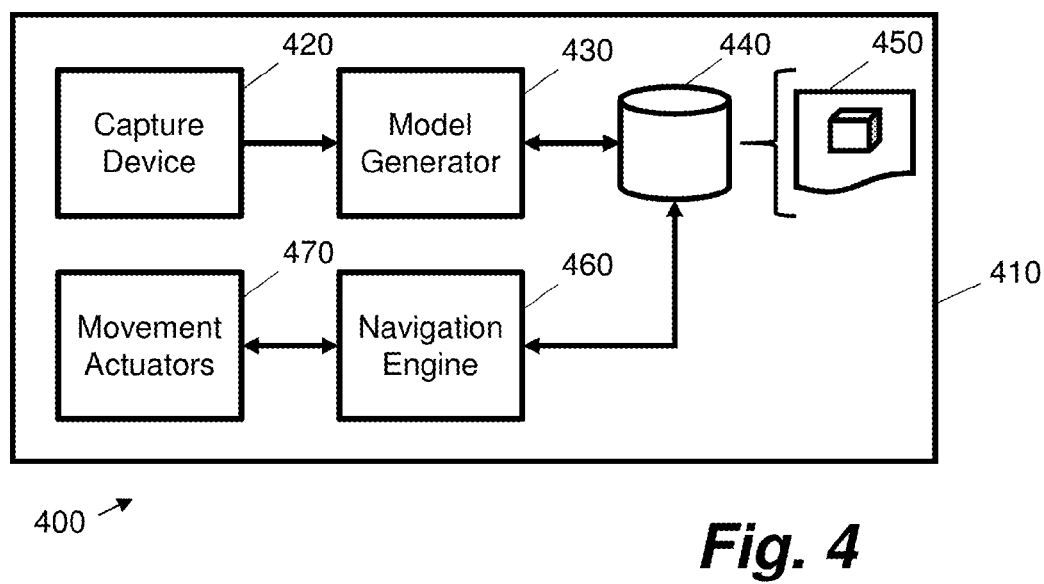
FIG. 4 is a schematic diagram of a robotic device according to an example.

FIG. 4 is a schematic diagram showing an example 400 of a robotic device 410 that is arranged to use the model generation techniques of the previous example to navigate a three-dimensional space. In one case, the robotic device 410 may comprise an implementation of mobile device 140 of FIG. 1. The robotic device 410 of FIG. 4 comprises a capture device 420, a model generator 430, a data storage device 440 configured to store a three-dimensional model 450, a navigation engine 460 and one or more movement actuators 470. The communicative coupling between the components of the robotic device 410 are shown in the Figure and are described below.

In the example 400, the capture device 420 is arranged to capture image data as the robotic device navigates a particular environment. In one case, the capture device 420 may be arranged to record a plurality of frames comprising one or more of depth data and colour data, said depth data indicating a distance from the capture device for a plurality of image elements. Each frame in this case may be associated with a different time of capture. In one case, the capture device 420 may comprise two or more specific sensory devices, e.g. an infrared or ultrasound sensor configured to scan a region of the space and an imaging device such as a camera. Any of the configurations described with reference to FIGS. 2A, 2B and 2C apply.

The capture device 420 of FIG. 4 is coupled to the model generator 430. In this case the model generator 430 may comprise an implementation of apparatus 310 from FIG. 3, wherein the image acquisition interface 330 may be communicatively coupled to the capture device 420. The model generator 430 is coupled to data storage device 440. In use, the model generator 430 is configured to generate the three-dimensional model 450 using any of the techniques described herein. The data storage device 440 may comprise volatile and/or non-volatile storage arranged to store data making up the three-dimensional model 450.

The navigation engine 460 of FIG. 4 is coupled to the data storage device 440 and is configured to access the three-dimensional model 450 stored therein. The navigation engine 460 is arranged to control the one or more movement actuators 470 to move the robotic device 410 with an environment. In particular, the navigation engine 460 is configured to access the three-dimensional model 450 generated by the model generator 430, e.g. as described with reference to the model engine 340 above, to navigate the robotic device 410 within the environment, e.g. wherein the three-dimensional model 450 is a model of the space comprising the environment. The movement actuators 470 may comprise any movement mechanisms, including wheels, rollers, rotors, propellers, mechanic limbs etc. The robotic device 410 may be a terrestrial, aerial and/or marine device. In one case, the capture device 420 may be statically mounted on the robotic device 410; as such a pose estimate of the capture device 420 is equal to a pose estimate for the robotic device 410 within the environment. This enables a pose estimate generated by the model generator 430 to also be used by the navigation engine 460 to determine a location and orientation of the robotic device 410 within the environment. In one case, the robotic device 410 may be arranged to perform one or more functions. For example, the robotic device 410 may be arranged to performing a mapping function, locate particular persons and/or objects (e.g. in an emergency), transport objects, perform cleaning or maintenance etc. To perform one or more functions the robotic device 410 may comprise additional components, such as further sensory devices, vacuum systems and/or actuators to interact with the environment.

In another example, a mobile computing device may comprise at least one capture device arranged to record a plurality of frames comprising one or more of depth data and colour data, said depth data indicating a distance from the capture device for a plurality of image elements, and the apparatus 310 or model generator 430 as described above.

Figure 5:
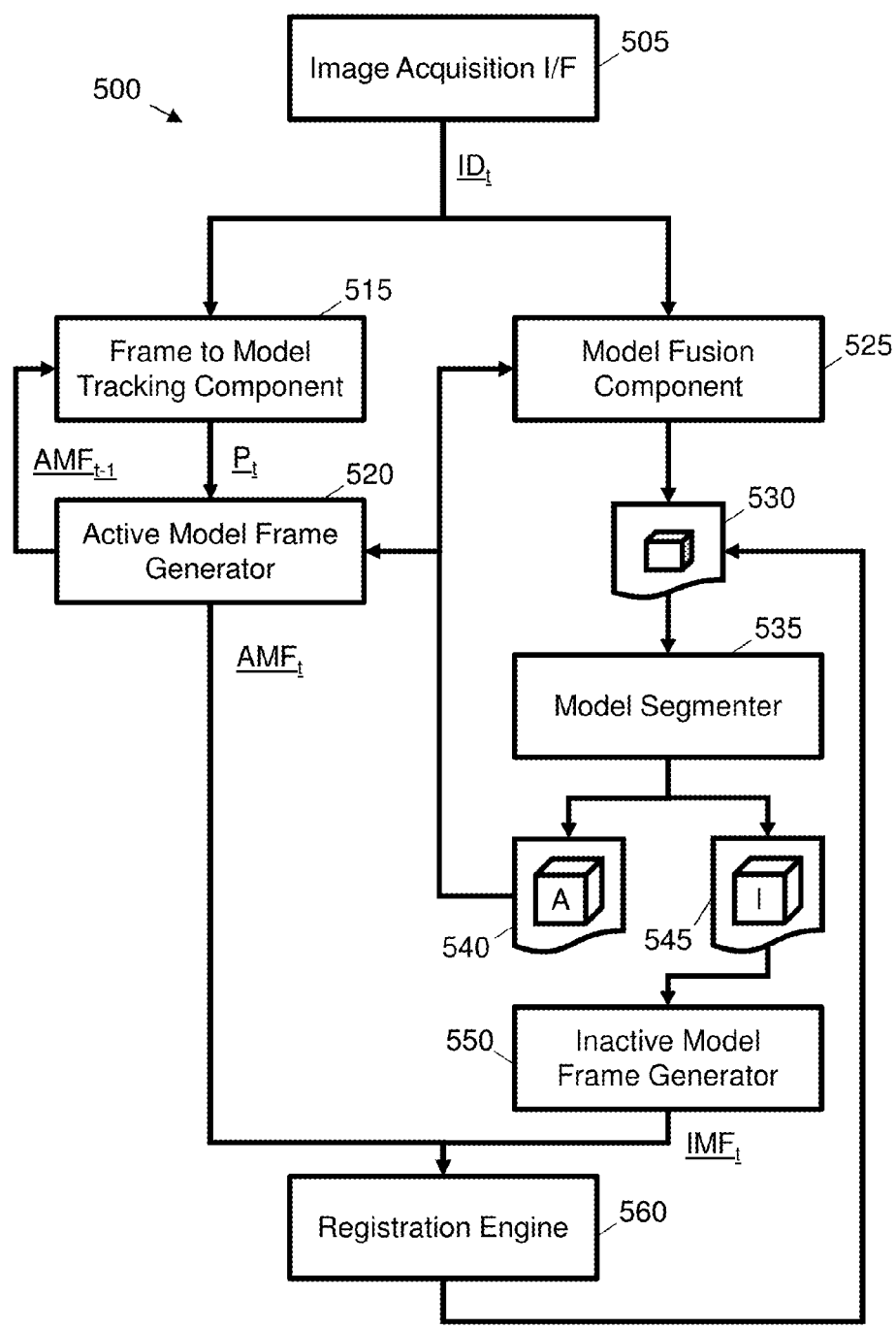
FIG. 5 is schematic diagram of components of a model engine according to an example.

FIG. 5 shows a more detailed example 500 of certain components of a model engine. For example, these components, amongst others, may be used as parts of the model engine 340 in FIG. 3 or the model generator 440 in FIG. 4 in certain implementations. The example 500 of FIG. 5 further shows schematically how these components may interact to update a three-dimensional model following receipt of a frame of image data.

FIG. 5 shows an image acquisition interface 505 that is communicatively coupled to a frame-to-model tracking component 515 and a model fusion component 525. The image acquisition interface 505 may function in a similar manner to the image acquisition interface 330 that is described above. In the present example, the image acquisition interface 505 is configured to supply frames of image data $ID_t$ to the frame-to-model tracking component 515 and the model fusion component 525. This image data may comprise current frames, at a time t, of depth data, $D_t^c$, and of photometric data, $C_t^c$. For example, in a simple case, these may comprise data stored in two two-dimensional arrays in memory at a time t, e.g. 640×480 depth values and 640×480×3 colour values. This data may be retrieved from a time-indexed data structure representing captured or previously-recorded image data and/or may be supplied as part of a live video feed, in each case the data relates to a live frame currently provided by at least one capture device.

The frame-to-model tracking component 515 is communicatively coupled to an active model frame generator 520. The active model frame generator 520 is configured to compute an active model frame. The frame-to-model tracking component 515 is then configured to compare an active model frame received from the active model frame generator 520 to a frame of image data received from the image acquisition interface 505. The model fusion component 525 is configured to update a three-dimensional model 530 based on a frame of image data received from the image acquisition interface 505.

FIG. 5 also shows a model segmenter 535. This may comprise an implementation of the model segmenter 360 as described with reference to FIG. 3. The model segmenter 535 is arranged to split the three-dimensional model 530 into two portions or sets: a first portion or set is referred to herein as "active" portions 540; and a second portion or set is referred to herein as "inactive" portions 545. This may comprise applying a time window to the three-dimensional model 530. As may be seen from FIG. 5, the active portions 540 are used by the active model frame generator 520 and the model fusion component 525. The inactive portions 545 are not used by the active model frame generator 520 and the model fusion component 525.

In particular, the active model frame generator 520 is arranged to access the active portions 540 to generate an active model frame. This may be performed based on a projection from the active portions 540 of the three-dimensional model. In FIG. 5, an active model frame generated by the active model frame generator 520 for a time t−1, $AMF_{t-1}$, is received by the frame-to-model tracking component 515, together with a frame of image data for a time t, $ID_t$, and is used to generate a pose estimate, $P_t$, for a capture device deemed to generate the frame of image data at the time t. As discussed previously, this may represent an actual location and orientation of a capture device or a device to which the capture device is statically mounted, or it may present a deemed virtual capture device. The latter may be the case if a series of still images are received and processed—in this case each image may be captured by a different camera device but the image set may be deemed to be captured by a single, moving capture device. The pose estimate may comprise variable values for the six degrees of freedom shown in FIG. 1C. The active model frame, $AMF_{t-1}$, may comprise predicted frames, at a time t−1, of depth data, $\hat{D}_{t-1}^a$, and of photometric data, $\hat{C}_{t-1}^a$.

The pose estimate at time t, $P_t$, is communicated from the frame-to-model tracking component 515 to the active model frame generator 520. The active model frame generator 520 is configured to use pose estimate at time t, $P_t$, to determine an active model frame at time t, $AMF_t$. This may comprise using the variable values of the pose estimate to determine a projection geometry using positional elements that comprise active portions 340 of the three-dimensional model.

In one case, the frame-to-model tracking component 515 may be configured to compare each of the predicted frames of depth and colour data at time t−1, $D_{t-1}^a$, and $\hat{C}_{t-1}^a$, to frames of image data for time t, $D_t^{ID}$ and $C_t^{ID}$. This comparison may comprise determining, for each pair of frames (i.e. for the depth data pair and the colour data pair), motion parameters that minimise an error function between the frames in each pair. A tracking error may then be defined as the sum of the depth data error and the photometric data error. This sum may be a weighted sum. In one case, the photometric data error may be multiplied by a weighting factor, e.g. to reduce its contribution with reference to the depth data error. This factor may be 0.1 in one case. A least squares function may be used to yield an estimate of the variable values for the degrees of freedom. This estimate may be used to determine a transformation that maps a pose estimate at time t−1, $P_{t-1}$, to a current pose estimate, $P_t$. This current pose estimate may be used to align the image data, $ID_t$, with the active portions 540. It may be used by the model fusion component 525 to fuse the image data, $ID_t$, with the active portions 540.

As well as active model frame generator 520, the example 500 of FIG. 5 further comprises an inactive model frame generator 550. The inactive model frame generator 550 is similar to the active model frame generator 520 but is configured to generate an inactive model frame, $IMF_t$, from the inactive portions 545 of the three-dimensional model. For example, an inactive model frame may be computed by the inactive model frame generator 550 based on a geometric projection from the inactive portions 545. In one case, the active model frame generator 520 and the inactive model frame generator 550 may be implemented by a common frame generator that is configured to receive active and inactive portions of the model as differentiated inputs in order to respectively generate active and inactive model frames. As described with reference to the active model frames, each inactive model frame may comprise a predicted frame of depth data, $\hat{D}_t^i$, and a predicted frame of photometric data, $\hat{C}_t^i$.

In FIG. 5 the registration engine 560 is arranged to receive an active model frame, $AMF_t$, from the active model frame generator 520 and an inactive model frame, $IMF_t$, from the inactive model frame generator 550. In the present example, the registration engine 560 is configured to compare these two frames to determine a transformation that aligns the active model frame with the inactive model frame. As shown by the arrow in FIG. 5, this transformation may then be used to update the three-dimensional model 530 to bring the active and inactive portions of the model into alignment. This transformation may be used to apply a non-rigid spatial deformation of positional elements for both the active and inactive portions. In one case, the deformation may be applied using a deformation graph. This is described in more detail with reference to FIG. 7. The deformation or alignment may make use of the current pose estimate $P_t$. In certain cases, the registration of active and inactive model frames may use a process similar to that of the frame-tomodel component 515. For example, rather than attempting to align a previous predicted frame with a frame of newly-received image data, the registration engine 560 is configured to determine a transformation, $H_t$, that aligns the active and inactive frames. If alignment is performed, the registration engine 560 may set all visible inactive positional elements, e.g. those visible in the inactive model frame, to be active.

The alignment or deformation performed by the registration engine 560 may enact a "loop" closure, i.e. align positional elements of the model generated from newly received image data with positional elements that correspond to the same region of the three-dimensional space that were previously generated and/or modified based on previously received image data. For example, without the registration engine 560, when a capture device completes a motion loop, e.g. returns to view a region of the space that was previously observed, previous portions of the model may be out of alignment with newer portions of the model. This misalignment or "drift" in the model occurs as the generation of the model uses estimates and seeks to minimise error functions, e.g. operates non-deterministically, such that small errors in the pose estimate and the model may accrue as the model is generated. The registration engine 560 in FIG. 5 attempts to continuously, e.g. for each frame, register active portions of the model within a current estimated capture device (i.e. active model) frame with the inactive portions of the model within the same frame. If registration is successful, e.g. based on an alignment metric or level of deformation that is required, a motion loop of the capture device has been closed, and the newer active portions have been aligned to the older inactive portions, wherein the entire three-dimensional model 530 may be non-rigidly deformed into place to reflect this registration. In certain cases, the registration engine 560 is configured to reactivate the inactive portions of the model that were used to perform the registration, e.g. those that were used in the generation of the inactive model frame. This enables tracking by the frame-to-model tracking component 515 and model fusion by the model fusion component 525 to take place between the registered areas of the model. As described above, tracking and fusing data is performed in areas of the three-dimensional model 530 that have been most recently observed (i.e. the active portions 540 or areas of the model), while older parts of the model that have not been observed in a period of time may be segmented by the model segmenter 535 into inactive portions 545 or areas of the model that are not used for tracking or data fusion.

Figure 6A:
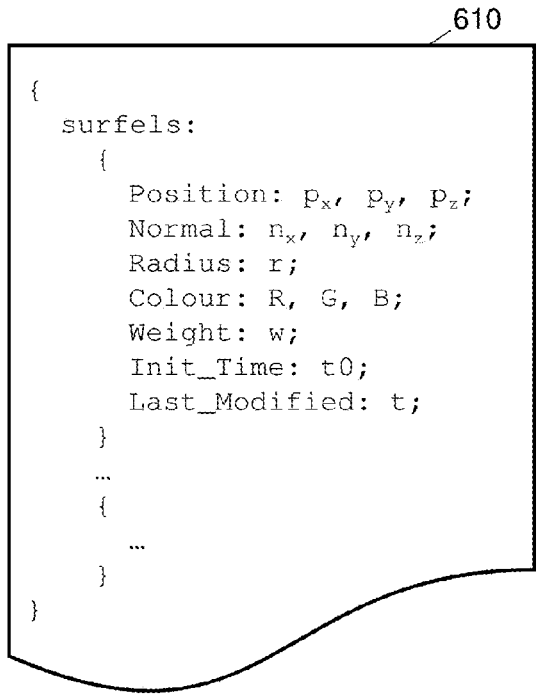
FIG. 6A is a schematic diagram showing example data for a three-dimensional surface element model.

FIG. 6A shows a schematic representation of a data structure 610 that may be used to store positional elements of a three-dimensional model. The data structure 610 is shown for example only and should not be seen as limiting; other approaches and formats for storing data may be used depending on the implementation. In this example, the three-dimensional model comprises a surface element model. A surface element model comprises data definitions for a plurality of surface elements or "surfels", wherein each surface element represents a two-dimensional area (i.e. a surface) in three-dimensional space. This is shown in FIG. 6A as the data opens with a definition of a list of surface elements, e.g. "{surfels: . . . }. This list may be an unordered list. In this case, each surface element in the surface element model comprises at least data defining a position of the surface element in three-dimensions (i.e. a positional element or component) and data defining a normal vector for the surface element in three-dimensions (i.e. a "facing" direction for a surface associated with the element). This is shown schematically in FIG. 6B. One description of "surfels" may be found in the paper "Surfels: Surface elements as rendering primitives" by Pfister, Hanspeter, et al. as published in proceedings of the 27th annual conference on computer graphics and interactive techniques, ACM Press/Addison-Wesley Publishing Co., in July 2000.

Figure 6B:
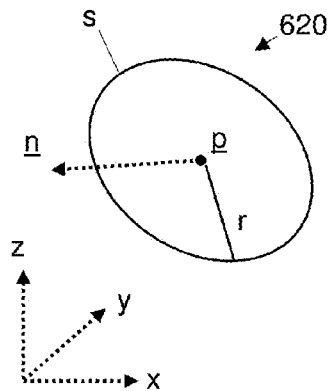
FIG. 6B is a schematic diagram showing attributes of a surface element according to an example.

FIG. 6B shows a schematic representation of a surface element or "surfel" 620. The surfel 620 comprises a surface, s, in three-dimensions. The surfel has a position, p, in three dimensions. In FIG. 6A this position is defined using a three-dimensional co-ordinate, e.g. the data "Position: $p_x$, $p_y$, $p_z$;" defining x, y and z co-ordinates. In other examples other co-ordinate systems may be used. In FIG. 6B the surfel also has a normal vector, n, that is defined within three-dimensions. In FIG. 6A this position is defined using a three-dimensional vector, e.g. the data "Normal: $n_x$, $n_y$, $n_z$;". Direction may be indicated using signed values within the vector definition. The example 610 in FIG. 6A also has further data that may be used, in certain examples, to describe the surface element. In the present case, the surface of the surfel is a circle or disc in three-dimensional space. As such, the surface in FIGS. 6A and 6B is defined by a radius, r, as set out as data "Radius: r;". The radius of each surfel is intended to represent the local surface area around a given point while minimising visible holes. In other examples, different data may be used to define the surface, e.g. using different geometric definitions and/or variables indicating the extent of the surface within three-dimensions. FIG. 6A shows that, in the present example, the surfel definition also comprises data defining: a colour of the surface ("Colour: R, G, B;"—in this case an RGB colour space is used but any known colour space is possible); a weight for the surfel ("Weight: w;"—this may be a real number that is used when fusing new measurements with the surfel); an initialisation time ("Init_Time: t0;") indicative of a time the surfel was first generated; and a last modified time ("Last_Modified: t;) indicative of a time when the surfel was last updated or modified. A surfel within this model representation may be declared as inactive when the time since that surfel was last updated or modified (e.g. had a raw image data value associated with it for data fusion) is greater than Sc. It should be appreciated that data defining attributes of a surfel may be added, modified or omitted depending on the implementation. As shown in FIG. 6A, multiple surfels may be defined in the list (e.g. between "{ . . . }" in the example).

Figure 7:
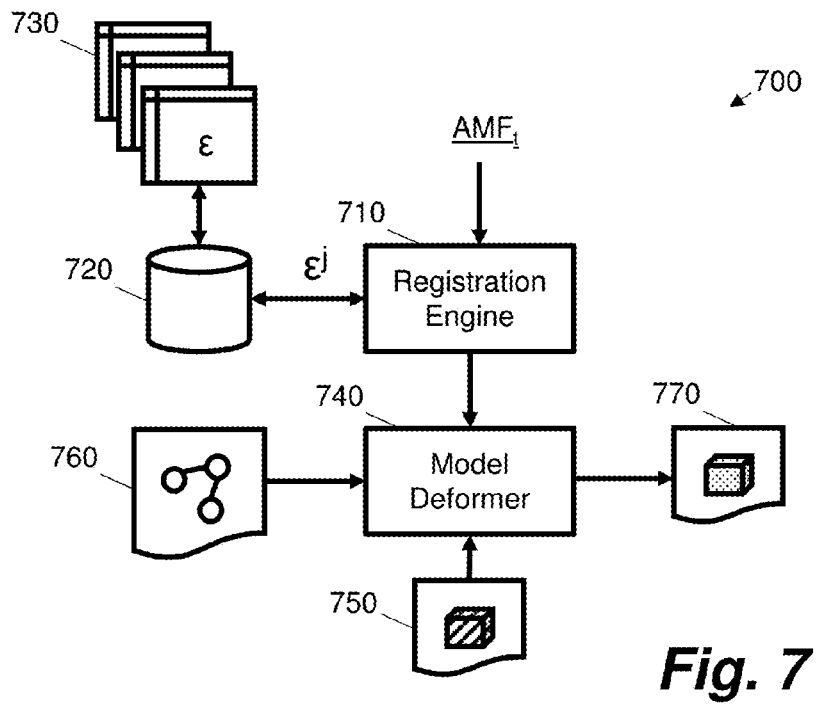
FIG. 7 is a schematic diagram showing an example that uses stored representations and a deformation graph.

FIG. 7 shows an example 700 of additional features of the registration engine 710 that may be used in certain implementations. In FIG. 7 the registration engine 710, which may have the same functionality as any of the previously described registration engines 370 or 560, is communicatively coupled to a data storage device 720. The data storage device 720 stores representations 730 ("ε") of the three-dimensional model over time. These representations 730 may comprise representations of active model frames, $AMF_t$, as they are generated by a model engine; e.g. may comprise a representation of depth data, $\hat{D}_t^a$, and of photometric data, $\hat{C}_t^a$. In one case the representation may be a compressed and/or down-sampled representation of an active model frame. Parts of predicted views in an active model frame that are devoid of any mapped surface may be filled, in certain cases, using a current frame from the image data. In certain cases, the representation may comprise a fern-encoding of an active model frame. Fern encoding is described in the paper Realtime RGB-D camera relocalization via randomized ferns for keyframe encoding by B. Glocker, J. Shotton, A. Criminisi, and S. Izadi, TVCG, September 2014. Ferns encode an RGB-D image as a string of codes made up of the values of binary tests on each of the RGB-D channels in a set of fixed pixel locations. The present example differs from the paper in that predicted views, as opposed to image data are stored. Each representation may comprise data associated with one or more of: a fern encoding string; a downsampled predicted frame of depth data; a downsampled predicted frame of photometric data; a current pose estimate; and an initialisation time for the representation. A downsampled frame size, e.g. 80×60 may be used.

In the example of FIG. 7, an active model frame, $AMF_t$, is received by the registration engine 710. An attempt is then made to match the active model frame, $AMF_t$, with one of the representations 730 in the data storage device 720. For example, a new representation may be generated from the received active model frame $AMF_t$ and compared with the representations 730 stored in the data storage device 720, e.g. the match may be performed using the fern encoded representations. A match may be indicated by an output of a comparison function, e.g. an error or match imaging metric may indicate a degree of similarity between compared frames or representations. For example, a comparison may be made between fern-encodings. In this case the fern-encoding may comprise a binary code, wherein two images may be compared by summing a "distance" between two binary codes. A smallest distance is deemed to be the "best" match, wherein the distance may be compared to a threshold to determine whether the match is "good". The active model frame, $AMF_t$, may be downsampled to perform the matching, e.g. a fern-encoding may be made on a downsampled frame. In this case, a metric value indicating a best match (e.g. a lowest value of an imaging metric indicating a difference or error) may be used to indicate a matching stored representation $\varepsilon^j$. The stored representation, as well as having data that is used for the matching (e.g. a fern-encoding) may also comprise a representation of a model frame, e.g. $\varepsilon_D^j$ and $\varepsilon_C^j$. In one case, a imaging metric value for a best match may further be compared with a predefined threshold to determine if the match is valid. For example, even a "best" match may be a poor actual match, e.g. have a high match error; the threshold comparison thus avoids the use of these poor matches. Downsampling may be used by the registration engine 710 as if a relatively "coarse" match is found and is correct, then subsequent active and inactive model frames will be close enough to enable alignment as performed in FIG. 5, e.g. they will align enough following a "global" loop closure such that a more precise "local" loop closure is possible.

In one case, if no match is found, e.g. if a matching imaging metric is above a given error threshold, then registration of the active model frame, $AMF_t$, and an inactive model frame is performed, e.g. as shown in FIG. 5. On the other hand, if a "best" match is found, e.g. if a matching imaging metric is also below a given error threshold, then the matching representation $\varepsilon^j$ is retrieved from the data storage device 720 and is accessed by the registration engine 710. The registration engine 710 is then configured to instruct a similar alignment operation to that described in relation to FIG. 5; however, in the present case, the alignment is performed between the active model frame, $AMF_t$, and the matching representation $\varepsilon^i$. For example, components of an active model frame, e.g. $\hat{D}_t^a$ and $\hat{C}_t^a$, may be aligned with components of the matching representation $\varepsilon^j$, e.g. $\varepsilon_D^j$ and $\varepsilon_C^j$. In one case, an alignment metric may be evaluated and compared with a threshold to determine if alignment is to be performed, e.g. a low level of misalignment as compared to a predefined threshold is required to continue with the alignment. If alignment is not to be performed, the registration engine 710 may attempt to perform the alignment of active and inactive model frames as described with reference to FIG. 5. If alignment is to be performed, the registration engine 710 may be arranged to instruct a model deformer 740 to deform an existing three-dimensional model 750, e.g. determine a deformation in three-dimensions that acts to align the components of the active model frame with the components of the matching representation. In certain cases, following this alignment, which may be considered a "global loop closure", active and inactive portions of the three-dimensional model are not updated. This may be because the alignment brings the active and inactive portions into greater alignment such that the registration shown in FIG. 5 may be performed (e.g. such that a "local loop closure" may be successfully performed on a next frame). Not updating the portions also enables potentially inaccurate alignments to be corrected or recovered from in subsequent registration operations. Following this alignment the current pose estimate $P_t$ may also be updated (e.g. in the form of $\hat{P}_t$) by applying the transform to a pose estimate associated with the representation (e.g. $H\varepsilon_P^j$).

In the present example, the model deformer 740 is arranged to access the existing three-dimensional model 750 and deform this model using a deformation graph 760 to generate an aligned three-dimensional model 770. The deformation graph 760 comprises a set of nodes and edges that are associated with distributed positional elements of the existing three-dimensional model 750. In one case, each node may comprise: a timestamp; a position in three dimensions; a transformation definition; and a set of neighbours. The neighbours of each node make up the edges of the graph, which may be directed. In this manner, the deformation graph connects portions of the three-dimensional model that influence each other when a deformation of the model is performed. The number of neighbours may be limited, e.g. in one implementation to four neighbours. The transformation definition may comprise a definition of an affine transformation, e.g. as represented by a 3 by 3 matrix (initialised to the identity matrix) and a 3 by 1 vector (initialised to zero), or by dual quaternions. When performing the deformation, the transformation definition of each node may be optimised according to a set of surface constraints. When a deformation is applied a set of influencing nodes in the graph for a particular positional element of the three dimensional model are identified. Based on this, a position of a positional element of the three-dimensional model may be deformed based on a weighted sum of the transformed influencing nodes, e.g. a weighted sum of the transformation definitions applied to each of the influencing nodes in accordance with a distance of a position of those nodes from the current positional element. When using a surface element model, e.g. as described with reference to FIGS. 6A and 6B, both the position and normal of a surface element may be deformed in this manner. For example, nodes in the deformation graph may be associated with surface elements based on their initialisation time. A list of these nodes may then be sorted by this timestamp. When a deformation is instructed for a surface element, a binary search may be performed through this list of nodes to populate a set of temporally nearby nodes. From this set, a set of k-nearest nodes are determined for the surface element based on a distance metric. These nodes are used then to deform the element. This process is quick and helps enable real-time or near real-time performance.

In one example, a deformation graph may be constructed on a frame-by-frame basis. In one particular case, a new deformation graph for the three-dimensional model may be constructed for each frame of image data (i.e. $F_t$ or $ID_t$). This may comprise determining the connectivity of the deformation graph, e.g. the set of neighbours for each graph node. In one case, a deformation graph is initialised using the three-dimensional model. For example, node positions for a frame may be determined from positions of positional elements within the three-dimensional model (e.g. p in the surfel model) and node timestamps may be set to positional element timestamps (e.g. the "Init_Time" of FIG. 6A). In one case, nodes for the deformation graph may be generated based on a sampling, such as a systematic sampling, of the positional elements in the three-dimensional model. This sampling may be uniformly distributed over the population, causing the spatial density of the deformation graph to mirror that of the three-dimensional model. The set of sampled nodes may be ordered based on the node timestamps. Following this, the connectivity of the deformation graph may be determined using time information. In one case, sets of nodes that are neighbours in time, e.g. based on the node timestamps, may be selected. For example, if there are four neighbours and a given node is being considered, nodes with the previous two timestamps (in a time-ordered list) and nodes with the subsequent two timestamps (in the list) may be selected as neighbours of the given node. This has an advantage of being computationally efficient and of preventing temporally uncorrelated areas of the three-dimensional model from influencing each other (e.g. preventing active areas influencing inactive areas). For example, a deformation graph associated with multiple passes of a common three-dimensional space may be complex and tangled within itself when considered spatially; however, ordering and considering the graph temporally allows the multiple passes to be disjoint and free to be aligned. This may be contrasted with comparative methods that determine graph connectivity based on pose times, e.g. in cases that use a pose graph.

An example process that may be applied by the model deformer 740 to use the deformation graph 760 to deform the existing three-dimensional model 750 to generate deformed model 770 will now be described in more detail. The model deformer 740 begins by accessing a given positional element of the existing three-dimensional model 750 (e.g. a surfel definition as described with reference to FIG. 6A or another voxel based definition). As a first operation, the model deformer 740 locates a node of deformation graph 760 that is closest to the given positional element in time. The time separation is stored as a variable. Next the model deformer 740 locates temporally nearby nodes, e.g. moving away from the time separation for a predefined number of nodes to explore. These nearby nodes may then be sorted by a distance metric such as Euclidean distance with reference to the position of the given positional element. A given number of "neighbour" nodes, e.g. using the neighbour limit discussed above, may then be selected as the closest k nodes. A set of weights for each of these neighbours may then be generated based on a normalised distance between the node and the given positional element. The sum of the weights may also be determined. Then as a last operation the transformation definitions for the neighbours may be applied, as weighted via individual calculated weights for each neighbour and normalised by the sum of the weights. This may comprise applying the variables for the affine transformation discussed above with reference to the given positional element to deform a position and a normal vector of the given positional element. In the surface element case of FIG. 6A other aspects of the given positional element stay the same (e.g. may be copied to the deformed model 770).

In one example, the alignment performed by way of the registration engine 370, 510 or 710 is performed using the model deformer 740. In this example, this is achieved by optimising the parameters of the deformation graph 760. The optimisation may reflect a surface registration in the three-dimensional model given a set of surface correspondences that are set based on the output of the registration engine 370, 510 or 710. These surface correspondences may indicate that a particular source position at a first time is to reach or coincide with a particular destination position at a second time. Each individual surface correspondence may be either absolute (relating a deformed position to an absolute position in three-dimensional space) or relative (relating a deformed position to a different deformed position). When aligning active and inactive frames (e.g. as described with reference to FIGS. 3 and 5) the source point may be representative of a point in an active model frame and the destination point may be representative of a point in an inactive model frame, which acts to align the active and inactive portions of the model. For example, the first time may comprise a time of initialisation for inactive model positional elements that are used to generate a given inactive model frame; the second time may be a current frame time; the source point may be a sampled positional element that is used to generate an active model frame (e.g. used to compute $\hat{D}_t^a$), as viewed based on the current pose estimate $P_t$; and the destination point may be a sampled positional element that is used to generate an active model frame (e.g. used to compute $\hat{D}_t^a$), as viewed based on the current pose estimate $P_t$ plus a defined transformation, H, in three dimensions. In this case the destination point is equivalent to a point in the inactive model frame, as you are applying the defined transformation (H) which was calculated to map active portions of the model onto inactive portions, e.g. the transformation is at least part of the alignment performed by registration engine 560 in FIG. 5. These surface correspondences may be used to apply a "local loop closure". Similarly, when aligning an active frame with a stored representation (e.g. as described with reference to FIG. 7): the first time may comprise a time of initialisation for the stored representation; the second time may be a current frame time; the source point may be a sampled positional element that is used to generate an active model frame (e.g. used to compute $\hat{D}_t^a$), as viewed based on the current pose estimate $P_t$; and the destination point may be a sampled positional element that is used to generate an active model frame (e.g. used to compute $\hat{D}_t^a$), as viewed based on a pose estimate for the representation plus a defined transformation, H, in three dimensions. Again as the defined transformation is applied to the active model portions, the destination point is representative of an alignment of the active and inactive models. These surface correspondences may be used to apply a "global loop closure". The surface correspondences may be calculated for a sampled set of pixels, e.g. for the frames used. In these cases the alignment or registration may comprise resolving the defined transformation in three dimensions for the set of surface correspondences.

In the above example, the surface correspondences may be used in one or more cost functions for the optimisation of the parameters of the deformation graph. For example, one cost function may comprise an error function equal to a sum of a distance error between a deformed source point (e.g. when applying the deformation graph) and a destination point, the source and destination points being those used in the surface correspondences. The temporal parameterisation of the three-dimensional model as described herein allows multiple passes of the same portion of three-dimensional space to be non-rigidly deformed into alignment allowing modelling to continue and new data fusion into revisited areas of the three-dimensional model. Another cost function may also be used to "pin" an inactive portion of the three-dimensional model into place, i.e. to deform the active portions of the model into the inactive portions. This cost function may comprise an error function equal to a sum of a distance error between a deformed source point (e.g. when applying the deformation graph) and a non-deformed destination point, the destination point being that used in the surface correspondences. Another cost function may also be used to keep previously registered areas of the three-dimensional model in place, i.e. when deforming a different area of the map, the relative positions of previously registered areas may need to be constrained to remain the same. This cost function may comprise an error function equal to a sum of a distance error between a deformed source point (e.g. when applying the deformation graph) and a deformed destination point. This cost function prevents loop closures and their associated deformations from pulling apart previously registered areas of the three-dimensional model. Error functions may also be defined to maximise rigidity in the defined transforms of the deformation graph (e.g. by minimising a distance metric between the transform multiplied by its transpose and the identity matrix) and to ensure a smooth deformation (e.g. based on a distance metric incorporating neighbour transforms). One or more of these described error functions may be minimised (e.g. within a weighted sum) to determine the transform definitions for the deformation graph. For example, an iterative Gauss-Newton method, together with sparse Cholesky factorisation may be used to solve the system of equations on a processing unit. A graphical processing unit, if available in an implementation, may be used to apply the deformation graph to the three-dimensional model. This may be performed in parallel on the graphical processing unit. In certain cases, one or more of the cost functions may be used to generate a metric to determine whether an alignment should be performed. For example, if one or more of the cost functions output an error value that is below a predefined threshold value (e.g. such as the cost function comparing deformed source and destination points), then an alignment is accepted; if the error value is above a predefined threshold value then the alignment is rejected (with the equality case being assigned appropriately).

Certain apparatus components described above use photometric and geometric frame-to-model tracking and fusing of incoming image data to generate a dense map or model of a three-dimensional space. Certain components further use model-to-model tracking or "local loop closures" to align portions of the three-dimensional model, e.g. portions representative of a repeated pass or view of an area of the three-dimensional space. Alignment may be achieved using a non-rigid space deformation. Certain components may also use a predicted surface appearance-based place recognition operation to resolve "global loop closures". These components enable a globally consistent dense three-dimensional model, for example using surfels, to be generated without the use of a pose graph, e.g. without the use of a separate graph structure that is used to model the pose of a capture device with regard to key frames of the image data. An apparatus incorporating these components is thus able to perform real-time or near real-time dense simultaneously location and mapping, with the operation being actually simultaneous rather than being performed as two separate operations.

Figure 8:
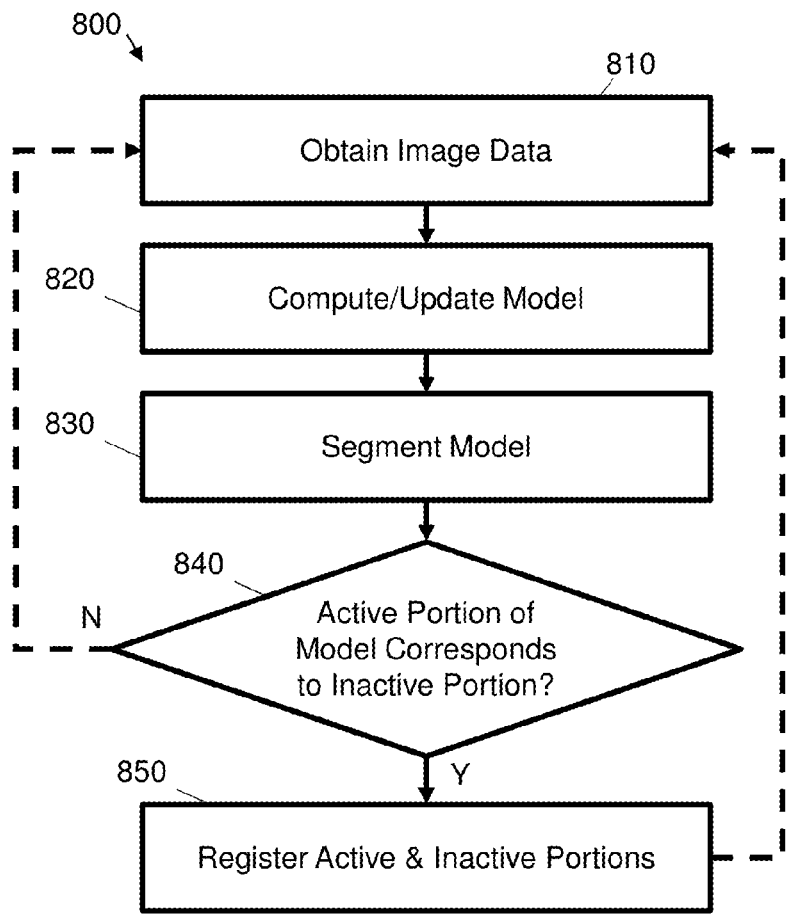
FIG. 8 is a flow diagram showing a method of updating a model of a three-dimensional space according to an example.

FIG. 8 shows a method 800 of updating a model of a three-dimensional space. This method may apply certain operations discussed above. At block 810, image data representing an observation of a three-dimensional space by a capture device is obtained. This may comprise, amongst others, receiving a frame of image data from a live video stream, set of still images, and/or a video file. The image data may comprise one or more of depth data and photometric, e.g. colour, data. At block 820, a three-dimensional model of the three-dimensional space is computed from the obtained image data. If the three-dimensional model already exists, e.g. in part, this may comprise obtaining the model and updating or adding data to the model. If the three-dimensional model does not exist, this may comprise initialising the model and bootstrapping a model representation. In certain cases, block 820 may comprise data fusion operations as described above. At block 830, the three-dimensional model is segmented or classified into at least active and inactive portions based on at least one model property. The at least one model property may comprise a time of initialisation or model update and/or a geometric measure, e.g. distance between a capture device and a scene, a distance from a predefined position and/or an angle of rotation from a predefined orientation.

At block 840 a comparison is made between active model portions and inactive model portions. If the image data represents a first set of image data captured or received then there may be no inactive portions at this stage, in which no alignment may be made and the method loops back to block 810. If this is the case, blocks 810, 820 and 830 may be repeated.

As the method is repeated, at block 820 only the active portions of the three-dimensional model, e.g. following the segmentation or partitioning at block 830, are used to update the model using the image data. Block 820 may involve determining predicted frames or views of the active portions of the model and using these to determine a pose of the capture device for the frame and for fusing the second set of image data with the model (e.g. only active parts of the model may be updated following data fusion).

As the method repeats, image data may be obtained at block 810 that is representative of an observation of the three-dimensional space following motion of the capture device. For example, the capture device may be in motion and record multiple passes of the three-dimensional space, wherein each pass may be recorded from a different set of locations and/or orientations. If the image data represents a revisit or re-observation of a given area of the three-dimensional space, then at block 840 there may be active portions of the model that correspond with pre-existing inactive portions of the model. For example, these may be newly-created model elements and previously created model elements for common positions in three-dimensions. In certain cases, block 840 may involve comparing predicted frames or views generated based on both the active and inactive models and determining a transformation (e.g. H) that maps one to the other. In one case, a result of one or more cost functions from the deformation graph as described above may be used as a metric to determine whether there is correspondence at block 840. For example, if a transformation is determined but an error metric indicates that this leads to greater errors in the model consistency then the method may loop to block 810; however, if the error metric is below a predefined threshold, then the method may proceed to block 850.

If the check at block 840 indicates that active and inactive portions do correspond, e.g. that a frame based on one may be aligned with a frame based on the other without exceeding a given bound of error, then at block 850 active portions of the updated three-dimensional model are registered with corresponding inactive portion of the three-dimensional model. This may comprise applying any determined transformation to align the active and inactive portions. In one case, it may comprise applying a transformation to align predicted views or frames as generated from each of the active and inactive portions using a current estimate of the orientation and location of the capture device, e.g. as applied using an optimised deformation operation based on a deformation graph. Registration at block 850 thus aligns active portions of the three-dimensional model generated following an observation of a region of the three-dimensional space with inactive portions of the model generated following at least one previous observation of said region. Registration at block 850 may only be performed if a cost function associated with the registration indicates an alignment is possible, e.g. based on an error metric being below a predefined threshold.

Figure 9:
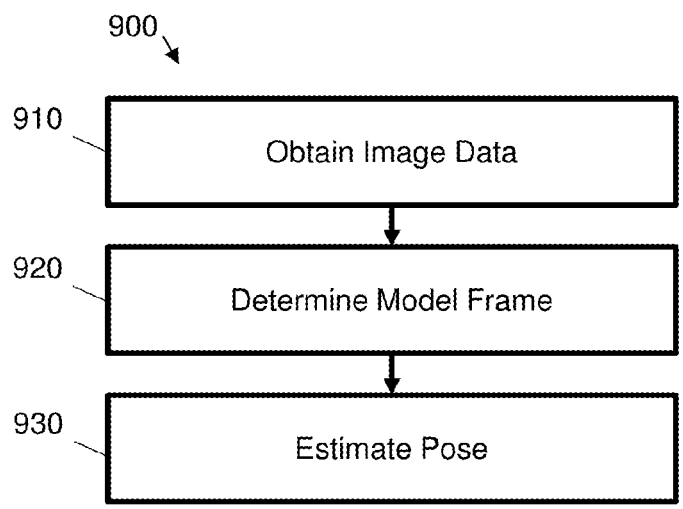
FIG. 9 is a flow diagram showing a method of estimating a pose of a capture device according to an example.

FIG. 9 shows a method 900 of estimating a pose of a capture device. This method may be used as part of block 810 and 820 in FIG. 8. At block 910, image data is obtained. This block may implement block 810. In this case, image data may comprise a frame of image data. At block 920, a model frame is determined. The model frame in this case is derived from active portions of the three-dimensional model of the three-dimensional space. For example, it may comprise data indicative of a projection or "splatter" of points in the model onto a defined plane within the model space. At block 930, a pose of the capture device used to generate the image data obtained at block 910 is estimated. This is performed by comparing data for a provided frame of said image data, e.g. as received at block 910 from a live camera and/or media file, with predicted data for the model frame. For example, this may be performed as described with reference to the frame-to-model tracking component 515 of FIG. 5. Block 930 may comprise comparing data from a model frame at time t−1 with image frame data for a time t. The defined plane used to project or "splatter" the points of the active model portions may comprise a previous pose estimate, e.g. for time t−1.

In the case of FIG. 9, the estimated pose of the capture device may be used in the registration operation at block 850. This may comprise determining predicted renderings of the three-dimensional model for the active and inactive portions using the pose of the capture device, and transforming the active portions such that the predicted renderings are aligned.

In one case, the image data comprises at least depth data indicating a distance from the capture device for a plurality of image elements, and estimating the pose of the capture device comprises comparing at least depth data for a provided frame of said image data with predicted depth data for a model frame. Additionally, or alternatively, the image data may comprise at least colour data for a plurality of image elements, and estimating the pose of the capture device may comprise comparing at least colour data for a provided frame of said image data with predicted colour data for a model frame. In one case, estimating the pose of the capture device comprises minimising an error function. In this case, the error function may be a function of: a geometric error based on a comparison of depth data for a provided frame of said image data with predicted depth data for a model, and a photometric error based on a comparison of colour data for a provided frame of said image data with predicted colour data for a model frame. A similar error function may also be used when determining a transformation that registers active and inactive portions at block 850.

In one example, registering the active portions of the three-dimensional model with the inactive portions of the three-dimensional model comprises performing a local loop registration if an alignment metric between active portions of the three-dimensional model for a given frame and inactive portions of the three-dimensional model for the given frame indicates a misalignment below a predefined threshold. For example, the alignment metric may be a cost function that results from applying a deformation with surface correspondences that include a transformation used to map an active model frame to an inactive model frame. The local loop registration may comprise applying the transformation by deforming the active and inactive portions using a deformation graph.

In one example, block 820 may comprise storing a representation of the three-dimensional model. This may be a fern-encoded representation. In this case, the method 800 may further comprise performing a global loop registration if a current representation of the three-dimensional model matches a previously-stored representation of the three-dimensional model. The global loop registration may comprise deforming the active and inactive portions using a deformation graph. In this case, the representation of the three-dimensional model may comprise a lower resolution representation of a predicted frame, the predicted frame being determined based on a projection from the active portions of the three-dimensional model. In cases where a deformation is applied, this may involve non-rigidly deforming the active portions of the three-dimensional model and it may be performed conditional on a geometric alignment between predicted frame data for the active and inactive portions.

In certain implementations the three-dimensional model may comprise a surface element model, e.g. as described with reference to FIGS. 6A and 6B. Segmenting the three-dimensional model at block 830 may comprise segmenting the three-dimensional model based on one or more of: a time of model generation for a given position in the three-dimensional model; a time of model update for a given position in the three-dimensional model; and a determined distance between a given position in the three-dimensional model and the capture device.

In certain test cases, it is found that the local loop registration is performed more frequently than the global loop registration (e.g. at a 10 or 20-1 ratio). Global loop registration may not be performed (e.g. may not be needed or a match may not be found) in certain cases. The application of local and global loop registration may depend on the image data being processed, e.g. may depend on the trajectory of the observation using the capture device. In certain test cases: a number of frames was on the order of $10^3$; a number of positional elements (e.g. surfels) was on the order of $10^6$; and a number of deformation nodes and a number of stored representations was on the order of $10^2$. Frame processing for these test cases was between 20 and 40 milliseconds, depending on the number of positional elements currently in the three-dimensional model. This was around a 30 Hz or frames-per-second processing speed. In these test cases, a test platform utilised an Intel® Core i7-4930K processor at 3.4 GHz with 32 GB of memory and an nVidia® GeForce® GTX 780 Ti graphical processing unit with 3 GB of memory.

Figure 10:
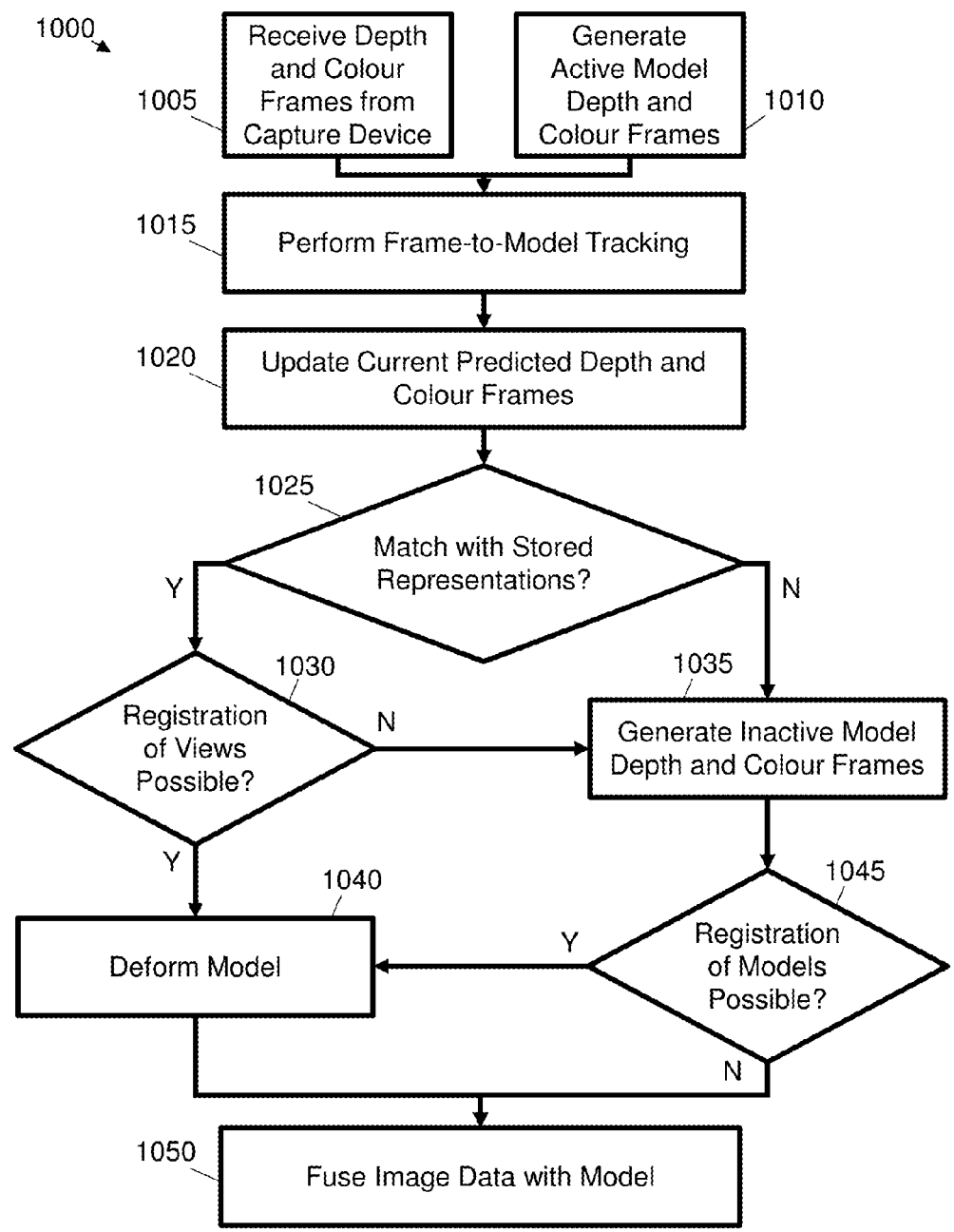
FIG. 10 is a flow diagram showing an example process for processing image data from a capture device to update a model of a three-dimensional space.

FIG. 10 shows in more detail an example process 1000 for updating a three-dimensional model of a three-dimensional space. This process 1000 may be seen to correspond with the components shown in FIG. 5. At block 1005, depth and colour frames are received from a capture device. At block 1010, predicted frames based on active portions of the three-dimensional model are generated. This may comprise processing surfel definitions and only using surfels with a last modified timestamp within a particular time window, e.g. in relation to a current time. This may further comprise using a pose estimate for the capture device at a time t−1, e.g. wherein positional elements that are classified as "active" are projected onto a plane indicating the location and orientation of an area viewable by the capture device at time t−1. At block 1015, frame-to-model tracking is performed. This may comprise determining a pose estimate for the current time by comparing the data received from blocks 1005 and 1010. At block 1020, the determined pose estimate for the current time may be used to update the predicted depth and colour frames, e.g. to project positional elements that are classified as "active" onto a plane indicating the location and orientation of an area viewable by the capture device at time t as indicated by the current pose estimate.

At 1025 a determination is made as to whether the updated predicted depth and colour frames match any stored representations. This may comprise the comparisons described with reference to FIG. 7. If a match is found with a particular stored representation then at block 1030 a determination is made as to whether registration of the updated predicted depth and colour frames and data corresponding to the particular stored representation is possible. This may comprise applying the deformation described with reference to the model deformer 740 in FIG. 7. If an output of one or more cost functions indicates that a deformation using a deformation graph results in an error above a given threshold, given surface correspondences that constraint points in one or more of the updated predicted frames to the stored representation, then the determination may be in the negative; otherwise, the determination may be in the positive. If the determination at block 1030 is negative, e.g. there is deemed to be no possible registration between a stored representation and updated predicted frames, the method moves to block 1035, wherein inactive model frames of depth and colour data are generated. If the determination at block 1035 is positive, e.g. there is deemed to be a possible registration between a stored representation and updated predicted frames, then the three-dimensional model is deformed at block 1040. This may comprise applying an optimised deformation graph, wherein the optimisation is constrained by the aforementioned surface correspondences, and wherein the optimisation minimises one or more error functions to determine transformation definitions to be applied by nodes of the deformation graph.

At block 1035, inactive model frames of depth and colour data are generated. At block 1045, a determination is made as to whether the updated predicted frames at block 1020 can be registered with the inactive model frames generated at block 1035. Block 1045 effective determines whether registration of the active model portions with the inactive model portions is possible based on data indicative of predicted views generated from each of the two portions in association with a current pose estimate. The determination at block 1045 may be based on a comparison of the two sets of predicted views using the techniques applied as part of the frame-to-model tracking at block 1015, e.g. by determining a geometric and/or photometric error. In one case, an output of a weighted error function comprising the geometric and/or photometric error may be used, amongst other metrics, to make the determination at block 1045, e.g. if the error is below a given threshold registration is deemed possible. Eigenvalues of a covariance measure for the error function may also be evaluated, e.g. compared with a threshold, to make the determination. Block 1045 may also comprise determining a transformation that maps the predicted frames onto each other, e.g. in a similar manner to determining a transformation for use in estimating the pose. This transformation may be used in a determination similar to that made at block 1030, i.e. may form part of a surface correspondence that is used to constraint an optimisation, wherein it may contribute to a metric used to determine if a registration of models is possible.

If there is a positive determination at block 1045, a deformation of the active and inactive portions of the model is performed at block 1040. This may comprise applying the transformation determined as part of the evaluation of block 1045. Again, block 1040 may comprise determining a set of deformation parameters, e.g. as a result of an optimisation, wherein the parameters may form part of a deformation graph. Block 1040 may comprise applying the parameters using the graph to deform points that make up the three-dimensional model. The output of block 1040 may set all visible inactive positional elements, e.g. those visible in the inactive model frame, to active.

Finally, at block 1050 the depth and colour frames received at block 1005 are fused with any deformed model resulting from block 1040. If the determination at block 1045 is negative, no model deformation may be performed and the image data may be fused with an un-deformed model.

Following block 1050 the method may be repeated for a subsequent frame of image data, e.g. returning to block 1005 where the next frames of depth and colour data are received. The fused model that is output at block 1050 may then be used to generate revised active model depth and colour frames at block 1010, e.g. to track against the next frames. After the repetition of block 1010 a representation may be stored for later use in the matching of block 1025.

Certain methods described above bring active areas of a three-dimensional model into strong alignment with inactive areas of the model to achieve tight local loop closures. This may be with respect to a surface when using a surface element model. In the event of active portions of the model drifting too far from inactive portions for a local alignment to converge, an appearance-based global loop closure method may be used to bootstrap a deformation that realigns the active portions of the model with the underlying inactive portions for tight global loop closure and model consistency, e.g. with respect to surfaces of the model.

Figure 11:
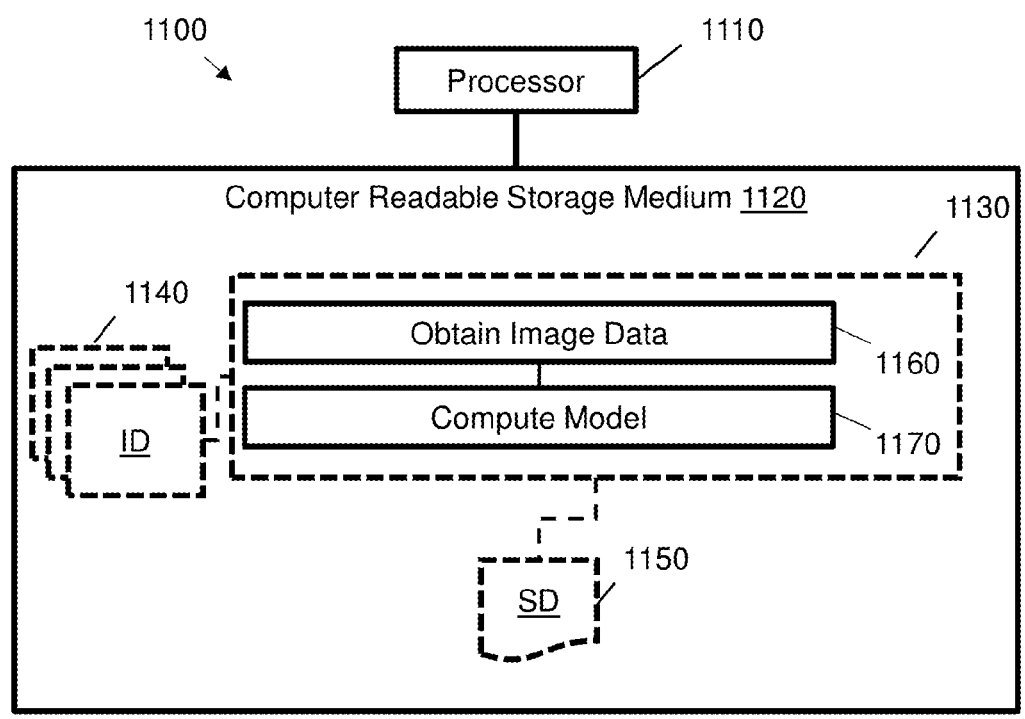
FIG. 11 is a schematic diagram showing a non-transitory computer readable medium according to an example.

Certain system components and methods described herein may be implemented by way of computer program code that is storable on a non-transitory storage medium. FIG. 11 shows a particular example 1100 of a system comprising at least one processor 1110 arranged to retrieve data from a computer-readable storage medium 1120. The system may comprise part of a mobile or robotic device as described above. The computer-readable storage medium 1120 comprises a set of computer-readable instructions 1130, stored thereon. The computer-readable storage medium 1120 in the present example is also configured to store frames of image data 1140 and a surface element definition 1150. The latter definition 1150 may comprise a definition such as that shown in FIG. 6A. In other examples, components 1130, 1140 and 1150 may be stored in separate mediums. In use, the at least one processor 1110 is configured to load the instructions 1130 into memory for processing. The instructions 1130 are arranged to cause the at least one processor 1110 to perform a series of actions. These actions comprise causing the processor to obtain, at instruction 1160, image data 1140 comprising a plurality of frames. In this example, each frame comprises depth data and colour data, said depth data indicating a distance of an object in the three-dimensional space from an imaging device used to capture the image data. The action further comprise causing the processor to compute, at instruction 1170, the surface element definition 1150 representing a model of the three-dimensional space based on the image data, the model comprising a plurality of elements, each element having a position in three-dimensions.

In one case, instruction 1170 comprises at least a sub-instruction to segment the model into active and inactive portions based on at least one observation property for each portion, such as a time a surface element in the definition 1150 was last updated. Instruction 1170 also comprises sub-instructions to, for a given frame in the image data: determine an estimated pose of the imaging device by comparing the depth data and colour data for the given frame with predicted depth and colour data for a model frame derived from the model; update the predicted depth and colour data for the model frame using the estimated pose of the imaging device; align the active portions of the model with the inactive portions of the model by transforming elements associated with at least one of the active and inactive portions of the model; and update the aligned active portions of the model using the depth data and colour data for the given frame.

In certain examples described herein, a problem of generating or updating a detailed three-dimensional model of a three-dimensional space is approached using a time-windowed data fusion in combination with frame-to-model tracking and non-rigid deformation. By incorporating many small local model-to-model loop closures in conjunction with larger scale global loop closures it is possible to stay close to a mode of a probability distribution of the model or map and produce globally consistent reconstructions in real-time without the use of pose graph optimisation or post-processing steps. The use of frequent non-rigid model deformations, e.g. on a frame-by-frame basis, improves both the trajectory estimate of the camera and the surface reconstruction quality. This approach is also effective in both long scale "corridor-like" camera motions and more loopy comprehensive room scanning trajectories.

The above examples are to be understood as illustrative. Further examples are envisaged. In one case, a model engine may be configured to apply the deformation techniques described herein and/or use a surface element model without the specific features of one or more of the model segmenter and the registration engine. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. Apparatus for generating a model of a three-dimensional space comprising:
   An image acquisition interface configured to obtain image data provided by a capture device, said image data representing an observation where there is relative movement between the three-dimensional space and the capture device over time; and
   a model engine configured to process the image data obtained by the image acquisition interface and to compute a three-dimensional model of the three-dimensional space, wherein the model engine comprises:
      a model segmenter configured to segment the three-dimensional model into at least active and inactive portions based on at least one model property, wherein the model engine is configured to use active portions of the three-dimensional model to update said model over time; and
      a registration engine configured to align active portions of the three-dimensional model with inactive portions of the three-dimensional model over time.

2. The apparatus of claim 1, wherein the model engine is configured to compute an active model frame based on a projection from the active portions of the three-dimensional model for use in updating the three-dimensional model.

3. The apparatus of claim 2, comprising:
   a frame-to-model tracking component configured to compare the active model frame to a provided frame from said image data to determine an alignment of the active portions of the three-dimensional model with the image data.

4. The apparatus of claim 3, wherein the frame-to-model tracking component is configured to estimate a pose of the capture device by comparing the provided frame at a current time with the active model frame at a previous time, the pose of the camera device representing a position and orientation of the capture device in the three-dimensional space.

5. The apparatus of claim 2, wherein the registration engine is configured to:
   compute an inactive model frame based on a projection from the inactive portions of the three-dimensional model;
   determine a deformation that aligns the active model frame with the inactive model frame; and
   update the three-dimensional model using the deformation.

6. The apparatus of claim 1,
   wherein the three-dimensional model comprises a surface element model,
   wherein each surface element in the surface element model comprises at least data defining a position of the surface element in three-dimensions and data defining a normal vector for the surface element in three-dimensions, and
   wherein each surface element represents a two-dimensional area in the three-dimensional space.

7. The apparatus of claim 1,
   wherein the model engine is configured to store representations of the three-dimensional model over time, and
   wherein the registration engine is configured to determine if a representation of the three-dimensional model at a given time matches a stored representation of three-dimensional model for a previous time and, responsive to a positive determination, align the representation of the three-dimensional model at the given time with the stored representation of three-dimensional model for the previous time.

8. The apparatus of claim 1, wherein the registration engine is configured to use a deformation graph to align active portions of the three-dimensional model with inactive portions of the three-dimensional model, the deformation graph being computed based on an initialisation time for positions in the three-dimensional model, the deformation graph indicating a set of neighbours for a given position in the three-dimensional that are to be used to modify the three-dimensional model at the given position during alignment.

9. The apparatus of claim 1, wherein the at least one model property comprises one of a time of model generation and model update for a given position in the three-dimensional model, wherein the inactive portions are indicative of a past observation time that differs from a current observation time by more than a predefined amount.

10. A method of updating a model of a three-dimensional space comprising:
obtaining a three-dimensional model of the three-dimensional space;
segmenting the three-dimensional model into at least active and inactive portions based on at least one model property;
obtaining image data representing an observation of the three-dimensional space following relative motion of a capture device with respect to the three-dimensional space;
updating the three-dimensional model based on the obtained image data and active portions of the three-dimensional model; and
registering active portions of the three-dimensional model with corresponding inactive portions of the three-dimensional model,
wherein said registering aligns active portions of the three-dimensional model generated following an observation of a region of the three-dimensional space with inactive portions of the model generated following at least one previous observation of said region.

11. The method of claim 10, wherein updating the three-dimensional model comprises:
estimating a pose of the capture device by comparing data for a provided frame of said image data with predicted data for a model frame, the model frame being derived from active portions of the three-dimensional model of the three-dimensional space; and
wherein registering the active portions of the three-dimensional model with the inactive portions of the three-dimensional model comprises:
determining predicted renderings of the three-dimensional model for the active and inactive portions using the pose of the capture device, and
transforming the active portions such that the predicted renderings are aligned.

12. The method of claim 11,
wherein the image data comprises at least depth data indicating a distance from the capture device for a plurality of image elements, and
wherein estimating the pose of the capture device comprises comparing at least depth data for a provided frame of said image data with predicted depth data for a model frame.

13. The method of claim 11,
wherein the image data comprises at least colour data for a plurality of image elements, and
wherein estimating the pose of the capture device comprises comparing at least colour data for a provided frame of said image data with predicted colour data for a model frame.

14. The method of claim 11,
wherein the image data comprises at least depth data and colour data for a plurality of image elements, said depth data indicating a distance of an object in the three-dimensional space from the capture device, and
wherein estimating the pose of the capture device comprises minimising an error function, the error function being a function of:
a geometric error based on a comparison of depth data for a provided frame of said image data with predicted depth data for a model, and
a photometric error based on a comparison of colour data for a provided frame of said image data with predicted colour data for a model frame.

15. The method of claim 10, wherein registering the active portions of the three-dimensional model with the inactive portions of the three-dimensional model comprises:
performing a local loop registration if an alignment metric between active portions of the three-dimensional model for a given frame and inactive portions of the three-dimensional model for the given frame indicates a misalignment below a predefined threshold.

16. The method of claim 10, wherein said updating comprises storing a representation of the three-dimensional model, and
wherein the method comprises:
performing a global loop registration if a current representation of the three-dimensional model matches a previously-stored representation of the three-dimensional model.

17. The method of claim 16, wherein the representation of the three-dimensional model comprises a lower resolution representation of a predicted frame, the predicted frame being determined based on a projection from the active portions of the three-dimensional model.

18. The method of claim 10, wherein the three-dimensional model comprises a surface element model, wherein each surface element in the surface element model comprises at least data defining a position of the surface element in three-dimensions and data defining a normal vector for the surface element in three-dimensions, wherein each surface element represents a two-dimensional area in the three-dimensional space.

19. The method of claim 10, wherein segmenting the three-dimensional model comprises segmenting the three-dimensional model based on one or more of:
a time of model generation for a given position in the three-dimensional model;
a time of model update for a given position in the three-dimensional model; and
a determined distance between a given position in the three-dimensional model and the capture device.

20. The method of claim 10, wherein registering the active portions of the three-dimensional model with the inactive portions of the three-dimensional model comprises:
non-rigidly deforming the active portions of the three-dimensional model based on a geometric alignment between predicted frame data for the active and inactive portions.

21. A robotic device comprising:
at least one capture device arranged to provide a plurality of frames comprising one or more of depth data and colour data, said depth data indicating a distance from the capture device for a plurality of image elements;
an apparatus for generating a model of a three-dimensional space comprising:
an image acquisition interface configured to obtain image data provided by a capture device, said image data representing an observation where there is relative movement between the three-dimensional space and the capture device over time, wherein the image acquisition interface is communicatively coupled to the at least one capture device; and a model engine configured to process the image data obtained by the image acquisition interface and to compute a three-dimensional model of the three-dimensional space, wherein the model engine comprises:

a model segmenter configured to segment the three-dimensional model into at least active and inactive portions based on at least one model property, wherein the model engine is configured to use active portions of the three-dimensional model to update said model over time; and registration engine configured to align active portions of the three-dimensional model with inactive portions of the three-dimensional model over time;

one or more movement actuators arranged to move the robotic device with the three-dimensional space; and a navigation engine arranged to control the one or more movement actuators, wherein the navigation engine is configured to access the three-dimensional model generated by the model engine to navigate the robotic device within the three-dimensional space.

22. A mobile computing device comprising:

at least one capture device arranged to record a plurality of frames comprising one or more of depth data and colour data, said depth data indicating a distance from the capture device for a plurality of image elements, and an apparatus for generating a model of a three-dimensional space comprising:

an image acquisition interface configured to obtain image data provided by a capture device, said image data representing an observation where there is relative movement between the three-dimensional space and the capture device over time, wherein the image acquisition interface is communicatively coupled to the at least one capture device; and a model engine configured to process the image data obtained by the image acquisition interface and to compute a three-dimensional model of the three-dimensional space, wherein the model engine comprises:

a model segmenter configured to segment the three-dimensional model into at least active and inactive portions based on at least one model property, wherein the model engine is configured to use active portions of the three-dimensional model to update said model over time; and registration engine configured to align active portions of the three-dimensional model with inactive portions of the three-dimensional model over time.

23. A non-transitory computer-readable storage medium comprising computer-executable instructions which, when executed by a processor, cause a computing device to perform a method of generating a model of a three-dimensional space, the method comprising:

obtaining image data comprising a plurality of frames, each frame comprising depth data and colour data, said depth data indicating a distance of an object in the three-dimensional space from an imaging device used to capture the image data; and computing a model of the three-dimensional space based on the image data, the model comprising a plurality of elements, each element having a position in three-dimensions, said computing comprising:

segmenting the model into active and inactive portions based on at least one observation property for each portion;

for a given frame in the image data:

determining an estimated pose of the imaging device by comparing the depth data and colour data for the given frame with predicted depth and colour data for a model frame derived from the active portions of the model;

updating the predicted depth and colour data for the model frame using the estimated pose of the imaging device;

aligning the active portions of the model with the inactive portions of the model by transforming elements associated with at least one of the active and inactive portions of the model; and updating the aligned active portions of the model using the depth data and colour data for the given frame.

* * * * *